United States Patent
Lee et al.

(10) Patent No.: US 8,175,747 B2
(45) Date of Patent: May 8, 2012

(54) JOINABLE ROBOT COMPONENT FOR ROBOT TOY, MODIFIABLE ROBOT TOY USING THE JOINABLE ROBOT COMPONENTS, AND CONTROL METHOD THEREOF

(75) Inventors: Nam-Yong Lee, Bucheon-si (KR); Dae-Kyung Kim, Seongnam-si (KR); Chang-Bae Park, Seoul (KR)

(73) Assignee: IROBOU Co., Ltd., Seoul (KR)

( * ) Notice: Subject to any disclaimer, the term of this patent is extended or adjusted under 35 U.S.C. 154(b) by 1123 days.

(21) Appl. No.: 12/029,001

(22) Filed: Feb. 11, 2008

(65) Prior Publication Data
US 2008/0129239 A1 Jun. 5, 2008

Related U.S. Application Data

(63) Continuation-in-part of application No. 10/740,612, filed on Dec. 22, 2003, now abandoned.

(51) Int. Cl.
*B25J 17/00* (2006.01)
*B25J 11/00* (2006.01)
*G05B 19/04* (2006.01)

(52) U.S. Cl. .......... 700/247; 74/490.03; 74/490.05; 318/568.11; 318/568.12

(58) Field of Classification Search .......... 74/490.03, 74/490.05, 490.07, 490.08, 490.01, 469; 446/69, 71, 50, 52, 162; 700/247, 248, 249, 700/245; 180/7.1, 8.1; 305/1, 2; 439/11, 439/13; 318/568.11, 568.12, 568.2, 568.24; 901/1, 50; 466/71
See application file for complete search history.

(56) References Cited

U.S. PATENT DOCUMENTS

| | | | |
|---|---|---|---|
| 5,523,662 A | 6/1996 | Goldenberg et al. | |
| 5,850,762 A * | 12/1998 | Kochanneck | 74/490.03 |
| 5,963,712 A * | 10/1999 | Fujita et al. | 700/264 |
| 6,084,373 A * | 7/2000 | Goldenberg et al. | 318/568.11 |
| 6,481,512 B1 * | 11/2002 | Nagatsuka | 180/8.1 |
| 6,486,725 B2 | 11/2002 | Goggs et al. | |
| D467,630 S | 12/2002 | Kawakita et al. | |
| 6,605,914 B2 * | 8/2003 | Yim et al. | 318/568.11 |
| 6,686,717 B2 * | 2/2004 | Khairallah | 318/568.11 |
| 7,013,750 B1 | 3/2006 | Kazami | |
| 7,137,465 B1 * | 11/2006 | Kerrebrock et al. | 180/22 |

* cited by examiner

*Primary Examiner* — Thomas Black
*Assistant Examiner* — Christine Behncke
(74) *Attorney, Agent, or Firm* — Lowe Hauptman Ham & Berner LLP

(57) ABSTRACT

A robot component is provided as assembly units for assembling a robot toy with a great variety of configuration. The robot component has three connectors, i.e., a rotatable connector of a gear shaft, a laterally protruding connector of the gear shaft, and a receivable connector of a middle housing. These connectors are engaged with various joint members so several robot components are joined to each other to realize the complete robot toy. The robot toy has a master main-processor unit board provided in one of the robot components and joint control systems respectively provided in the other robot components. Each joint control system operates the robot component according to a predefined operation pattern when the master main-processor unit board transmits robot control signals.

10 Claims, 24 Drawing Sheets

JOINABLE ROBOT COMPONENT FOR ROBOT TOY, MODIFIABLE ROBOT TOY USING THE JOINABLE ROBOT COMPONENTS, AND CONTROL METHOD THEREOF

CROSS REFERENCE TO RELATED APPLICATION

This is a Continuation-in-Part of Non-provisional application Ser. No. 10/740,612, filed Dec. 22, 2003, entitled "Artificial Intelligence Robot Toy and Control Method thereof", the entire disclosures of which are totally incorporated herein by reference in its entirety.

BACKGROUND OF THE INVENTION

1. Field of the Invention

The present invention relates to a robot toy, and more specifically, to a joinable robot component, a modifiable robot toy that can be easily assembled and configured in various shapes by using a single kind of joinable robot component, and a control method thereof.

2. Description of the Related Art

In general, toys (particularly, a movable robot toys) are classified into a high-grade type (i.e., an electric motor-driven type) and a simple type (i.e., windup type). The high-grade type robot toy is moved through the motion of several joints that are driven by a motor and controlled by a wireless or wired remote controller.

In the controls of the robot toys using such a remote controller, whoever is skilled to the handling of the remote controller can control the robot toys, but some users who are not accustomed to the handling of the remote controller may not feel interest and love in the robot toys. In particular, after operating all the functions of such robot toys that request a motion as above several times, a user may be easily fed up and carefree with the robot toys, so that there is a drawback in that the real use lifecycle of these robot toys is short.

Also, since the robot toys moved using joints are marketable in the form of a single product, it is impossible that a user extends an assembly structure of one set robot toy to various shapes, for instance, puppy robot, dinosaur robot, or android. In particular, for mechanical assembling of electronic circuit and control circuit used for controlling joints, particular apparatuses and high costs are required, which is burdensome to general users. In addition, when motor or control circuit is disordered or robot mechanism is fractured, what the repair of the disorder is impossible is indicated as a problem.

SUMMARY OF THE INVENTION

Accordingly, in order to solve the above discussed problems, it is desirable to provide a robot toy which can be easily assembled and freely modified in configuration, shape and design with relatively lower cost and higher reliability.

An object of the present invention is to provide a joinable robot component that can be used as assembly units for assembling robot toys with a great variety of configuration.

Another object of the present invention is to provide a modifiable robot toy that can be freely configured in various shapes by using a single kind of joinable robot component and various joint members.

A still another object of the present invention is to provide a modifiable robot toy that allows an addition of the joinable robot components, a free modification in configuration, and a simple solution to trouble.

A still another object of the present invention is to provide a modifiable robot toy in which robot components are independently and freely assembled with relatively lower cost and higher reliability.

A further another object of the present invention is to provide an artificial intelligence robot toy in which proper motion and response are performed according to various shapes of robot mechanisms, and price competitiveness and motion reliability are secured.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to one aspect of the present invention, a joinable robot component comprises a circuit board, a lower case, a middle housing, a gear shaft, a motor, a gear assembly, and an upper case. The lower case accommodates the circuit board. The middle housing is located above the lower case and the circuit board and has a slot-like opening formed at a first end thereof. The middle housing also has a receivable connector formed at a second end thereof, and a first hole formed above the opening. The gear shaft is inserted into and upwardly extended from the first hole, and vertically passes through the opening. The gear shaft has a laterally protruding connector located in the opening, and an upper end acting as a rotatable connector. The motor is located between the circuit board and the middle housing and electrically coupled to the circuit board. The gear assembly is located over the middle housing and transmits a turning force generated by the motor to the gear shaft. The upper case is located above the middle housing and covers the gear shaft and the gear assembly. The upper case has a second hole formed above the first hole and receiving the upper end of the gear shaft.

In the joinable robot component, the circuit board may be a joint control system which supplies an electric power and control signals to the motor and which transmits and receives data to and from a master main-processor unit board of another joinable robot component.

In the joinable robot component, the joint control system may include an inverse power preventing part supplied with a non-driving voltage to prevent an inverse voltage, a constant voltage part for converting and outputting the output non-driving voltage of the inverse power preventing part to a constant level of digital voltage, a filter part for filtering a noise including a ripple voltage from the supply voltage of the constant voltage part and supplying a filtered voltage, and a voltage detecting part for detecting level of the non-driving voltage obtained from the inverse power preventing part. The joint control system may further include a motor driving part for controlling and driving the motor in a pulse width modulation (PWM) way according to the voltage obtained by the constant voltage part and the inverse power preventing part, a rotation sensing part driven by the supply voltage of the filter part to sense the rotation of the gear assembly, a current detecting part for detecting a load current of the motor through the motor driving part, first to third A/D converters for converting and outputting the output signals of the voltage detecting part, the current detecting part, and the rotation sensing part to digital signals respectively, and a main-processor unit for outputting a PWM signal and a direction signal depending on operation modes provided from the master main-processor unit board to drive the motor and respectively computing the voltage level, the current level and the rotational ratio obtained by the first to third A/D converters and transmitting the computed voltage level, the current level and the rotational ratio to the master main-processor unit board.

The joinable robot component may further comprise at least one joint member having at least one of a pentagonal receivable hole, a rectangular insertional piece, and a spanner type receivable slot. Each joint member is engaged with one of the rotatable connector, the laterally protruding connector, and the receivable connector.

The joinable robot component may further comprise a triangular plate shaped joint member having two rectangular receivable grooves which are arranged at right angles to each other. Each receivable groove receives the rectangular insertional piece when the joint member has the rectangular insertional piece.

The joinable robot component may further comprise at least one of a wheel-like joint member, a wing-like joint member, and a foot-like joint member, which has a pentagonal receivable hole to be engaged with the rotatable connector.

According to another aspect of the present invention, a modifiable robot toy comprises a plurality of joinable robot components, a master main-processor unit board, a plurality of joint control systems, and a plurality of joint members. The joinable robot components are provided as assembly units for the robot toy. The master main-processor unit board is provided in a first one of the robot components and outputs robot control signals that correspond to predefined operation patterns in second ones of the robot components. Each joint control system is provided in the second robot component and operates a corresponding one of the robot components according to the predefined operation pattern while transmitting and receiving data to and from the master main-processor unit board. The joint members couple the robot components so as to realize the complete robot toy.

In this robot toy, each robot component includes a lower case accommodating a circuit board which is one of the master main-processor unit board and the joint control system. Each robot component also includes a middle housing, a gear shaft, a motor, a gear assembly, and an upper case. The middle housing is located above the lower case and the circuit board and has a slot-like opening formed at a first end thereof, a receivable connector formed at a second end thereof, and a first hole formed above the opening. The gear shaft is inserted into and upwardly extended from the first hole, vertically passing through the opening. The gear shaft has a laterally protruding connector located in the opening, and an upper end acting as a rotatable connector. The motor is located between the circuit board and the middle housing and electrically coupled to the circuit board. The gear assembly is located over the middle housing and transmits a turning force generated by the motor to the gear shaft. The upper case is located above the middle housing, covering the gear shaft and the gear assembly. The upper case has a second hole formed above the first hole and receiving the upper end of the gear shaft.

In the modifiable robot toy, the robot components may be electrically coupled in series or parallel to each other through two power lines, a single transmission line and a reception line.

In the modifiable robot toy, the joint members may include a shaft shaped joint member having two ends. Each end has one of a pentagonal receivable hole, a rectangular insertional piece, and a spanner type receivable slot, and is engaged with one of the rotatable connector, the laterally protruding connector, and the receivable connector.

In the modifiable robot toy, the joint members may include a triangular plate shaped joint member having two rectangular receivable grooves which are arranged at right angles to each other. Each receivable groove receives the rectangular insertional piece when the joint member has the rectangular insertional piece.

In the modifiable robot toy, the joint members may include at least one of a wheel-like joint member, a wing-like joint member, and a foot-like joint member, which has a pentagonal receivable hole to be engaged with the rotatable connector.

In the modifiable robot toy, each joint control system may includes: an inverse power preventing part supplied with a non-driving voltage to prevent an inverse voltage; a constant voltage part for converting and outputting the output non-driving voltage of the inverse power preventing part to a constant level of digital voltage; a filter part for filtering a noise including a ripple voltage from the supply voltage of the constant voltage part and supplying a filtered voltage; a voltage detecting part for detecting level of the non-driving voltage obtained from the inverse power preventing part; a motor driving part for controlling and driving the motor in a pulse width modulation (PWM) way according to the voltage obtained by the constant voltage part and the inverse power preventing part; a rotation sensing part driven by the supply voltage of the filter part to sense the rotation of the gear assembly; a current detecting part for detecting a load current of the motor through the motor driving part; first to third A/D converters for converting and outputting the output signals of the voltage detecting part, the current detecting part, and the rotation sensing part to digital signals respectively; and a main-processor unit for outputting a PWM signal and a direction signal depending on operation modes provided from the master main-processor unit board to drive the motor and respectively computing the voltage level, the current level and the rotational ratio obtained by the first to third A/D converters and transmitting the computed voltage level, the current level and the rotational ratio to the master main-processor unit board.

According to still another aspect of the present invention, a method for controlling a robot toy comprises the steps of: (a) determining a present position of joints from a rotation sensing part informing a present position of robot components; (b) obtaining an error from the determined present position and a target position provided by a master main-processor unit board; (c) computing a variation rate of the obtained error and then performing a proportional differential control arithmetic of the computed variation rate; (d) calculating an application voltage of motors provided from the master main-processor unit board and detecting a current of the motors while supplying the calculated voltage; and (e) determining whether or not the detected current exceeds a limit current, when it is determined that the detected current exceeds the limit current, cutting off the voltage applied to the motors, and when it is determined that the detected current does not exceed the limit current, repeating the steps after the step (a).

This method may further comprise the steps of: when an interrupt is generated from the master main-processor unit board, changing a present operation mode variable and a target value, changing a transmission port to an output port, and transmitting the detected present position of the joints and the current of the motors; and after transmitting the detected present position of the joints and the current of the motors, changing the transmission port to an input port.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
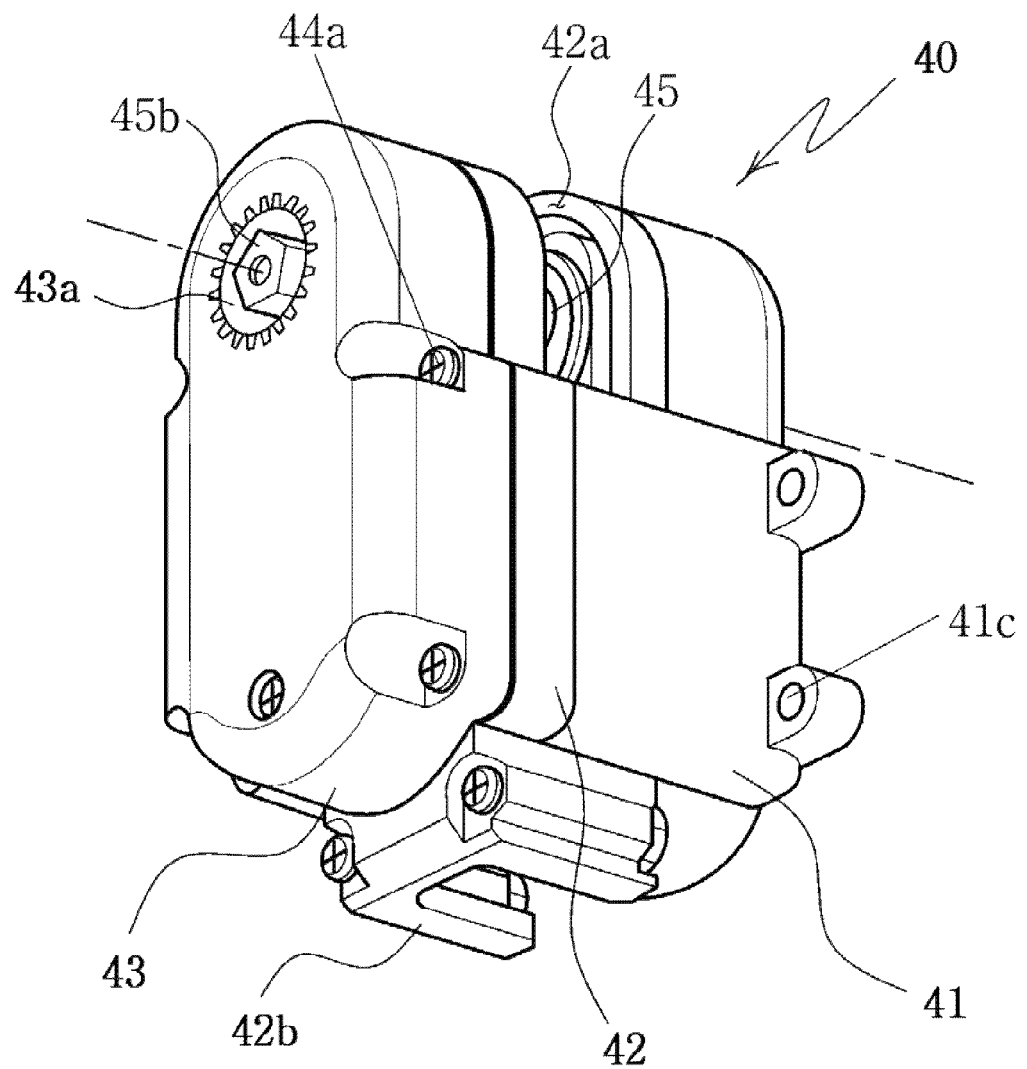
FIG. 1 is a perspective view showing a joinable robot component for a modifiable robot toy according to an embodiment of the present invention.

FIG. 1 is a perspective view showing a joinable robot component for a modifiable robot toy according to an embodiment of the present invention. And FIGS. 2A and 2B are exploded perspective views of the joinable robot component shown in FIG. 1.

Figure 2A:
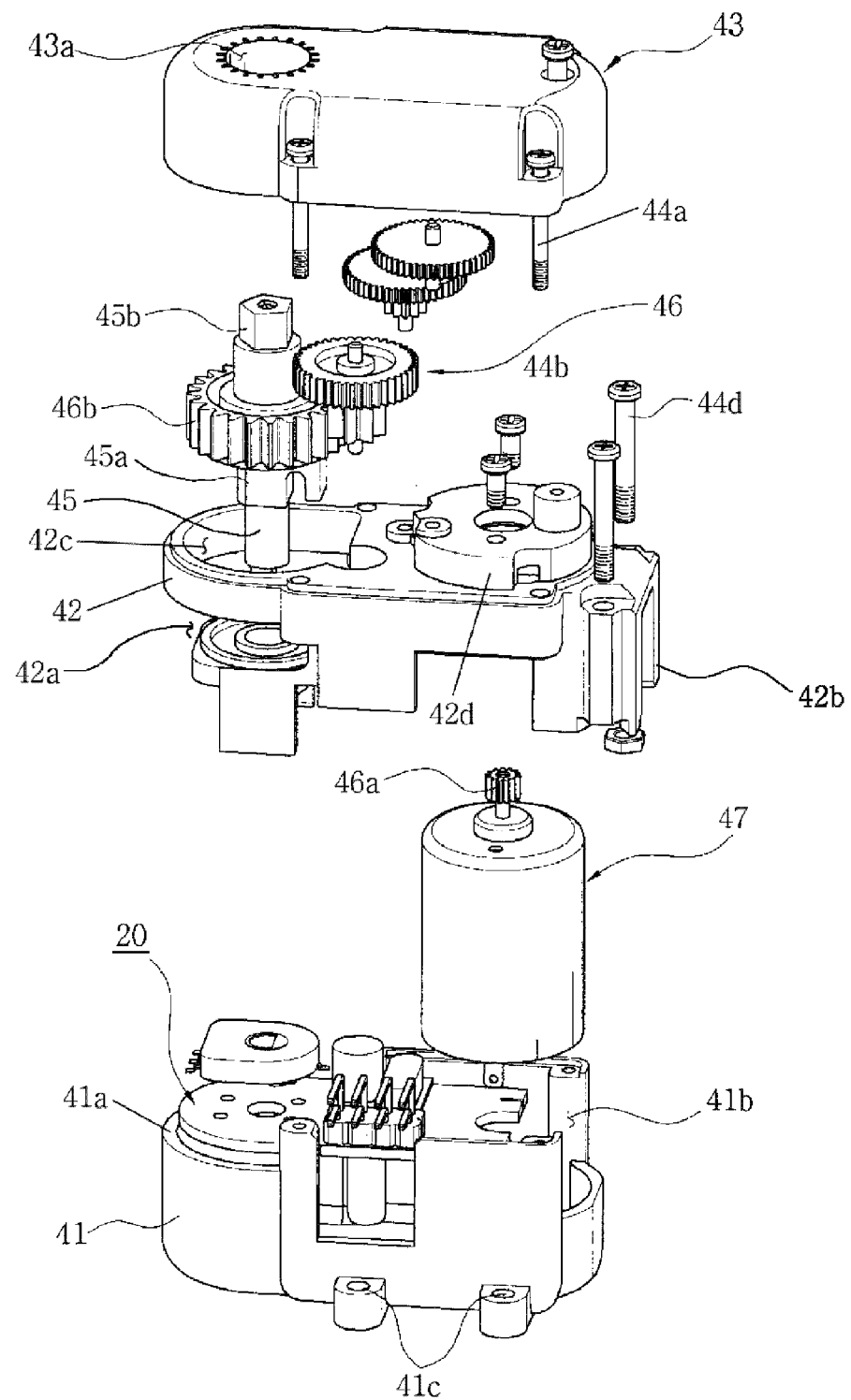
FIGS. 2A and 2B are exploded perspective views of the joinable robot component shown in FIG. 1.
Figure 2B:
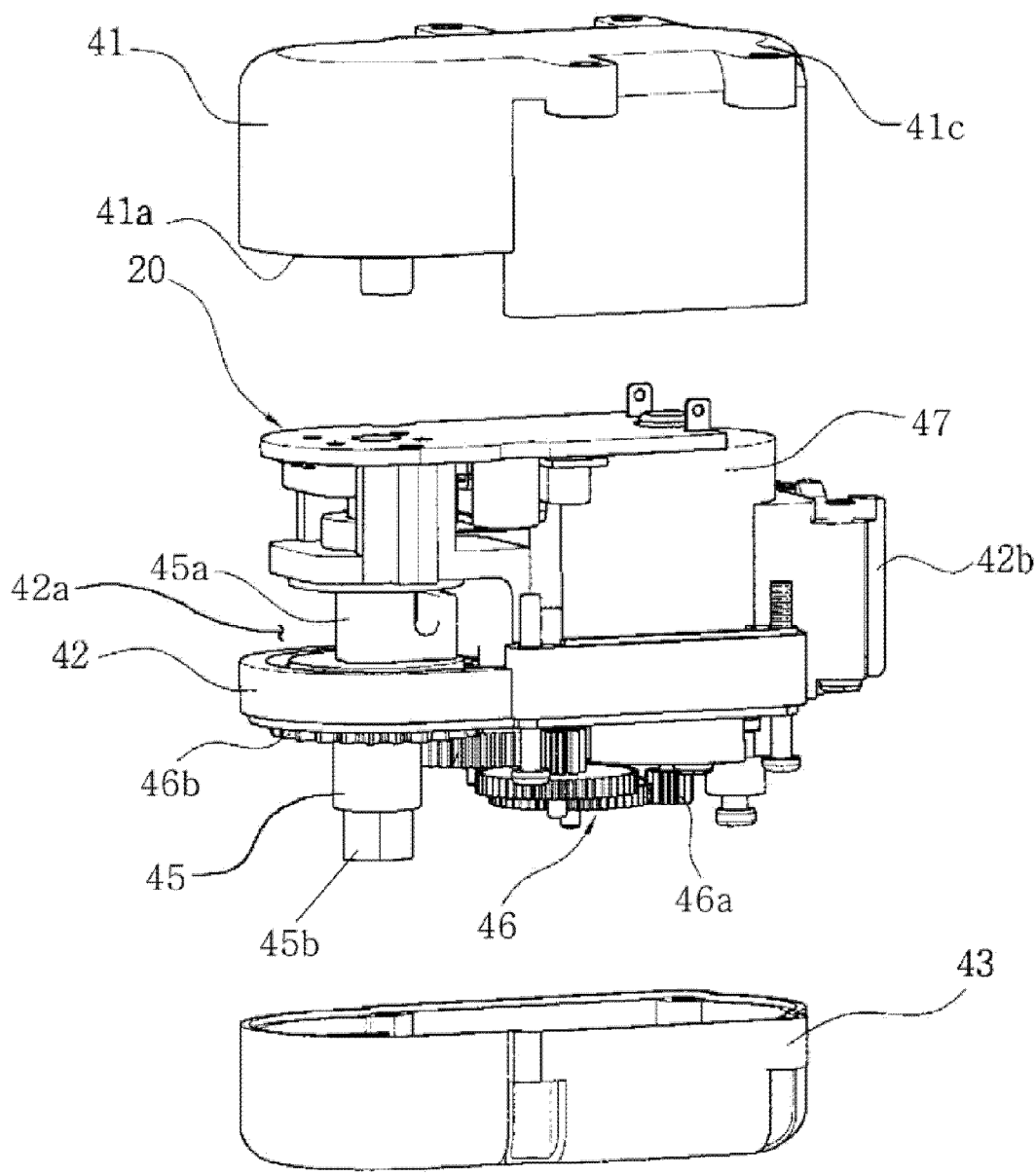

Referring to FIGS. 1, 2A and 2B, the joinable robot component 40 is provided as an assembly unit for the robot toy. Specifically, a plurality of such joinable robot components 40 are mechanically joined to each other by means of several kinds of joint members and thus realize the complete robot toy.

The robot component 40 has a substantially hexahedral shape. The robot component 40 includes a lower case 41, a middle housing 42, and an upper case 43, which are combined together through first screws 44a. The robot component 40 also includes a gear shaft 45, a gear assembly 46, a motor 47, and a circuit board 20, all of which are assembled in the combination of the lower case 41, the middle housing 42, and the upper case 43.

The lower case 41 has a first recessed part 41a formed at a first end thereof and a second recessed part 41b formed at a second end thereof. The lower case 41 further has several screw holes 41c. The lower case 41 completely accommodates the circuit board 20.

The middle housing 42 is located above the lower case 41 and the circuit board 20. The middle housing 42 has a slot-like opening 42a formed at a first end thereof and a receivable connector 42b formed at a second end thereof. The slot-like opening 42a is located in and exposed through the first recessed part 41a of the lower case 41. The receivable connector 42b is located in and outwardly protruded from the second recessed part 41b of the lower case 41.

The middle housing 42 further has a first hole 42c formed above the opening 42a. The gear shaft 45 is inserted into and upwardly extended from the first hole 42c and vertically passes through the opening 42a. The gear shaft 45 has a laterally protruding connector 45a located in the opening 42a. The middle housing 42 further has a motor cover 42d formed near the receivable connector 42b. The motor 47 is located between the circuit board 20 and the motor cover 42d, rotating clockwise or counterclockwise. The motor 47 is electrically coupled to the circuit board 20 and mechanically connected to the motor cover 42d through second screws 44b.

The gear assembly 46, located over the middle housing 42, is composed of several gears including a gear 46a of the motor 47 and a gear 46b of the gear shaft 45. The turning force generated by the motor 47 is transmitted to the gear shaft 45 through the gear assembly 46.

The upper case 43 is located above the middle housing 42 and covers the gear shaft 45, the gear assembly 46, and the motor cover 42d. The upper case 43 has a second hole 43a formed above the first hole 42c of the middle housing 42. The second hole 43a receives an upper end 45b of the gear shaft 45 which forms a pentagonal shape. The upper end 45b of the gear shaft 45 acts as a rotatable connector.

As discussed above, the joinable robot component 40 has three connectors, i.e., the rotatable connector 45b of the gear shaft 45, the laterally protruding connector 45a of the gear shaft 45, and the receivable connector 42b of the middle housing 42. These connectors 45b, 45a and 42b can be engaged with various joint members when the joinable robot components 40 are joined to each other to realize the complete robot toy.

FIGS. 3A to 3K are perspective views showing first to eleventh joint members used to couple the joinable robot components shown in FIG. 1.

Figure 3A:
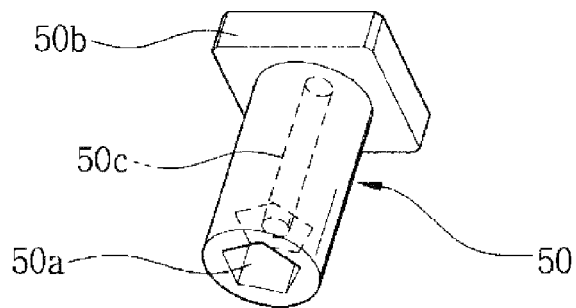
FIGS. 3A to 3K are perspective views showing first to eleventh joint members used to couple the joinable robot components shown in FIG. 1.

As shown in FIG. 3A, the first joint member 50 has a shaft with a predetermined length. The first joint member 50 has a pentagonal receivable hole 50a formed at one end of the shaft, and a rectangular insertional piece 50b formed at the other end of the shaft. The pentagonal receivable hole 50a can receive the rotatable connector 45b of one robot component 40, and the rectangular insertional piece 50b can be inserted into the receivable connector 42b of another robot component 40. Also, the first joint member 50 has a screw hole 50c which communicates with a screw hole in the rotatable connector 45b through the receivable hole 50a.

Figure 3B:
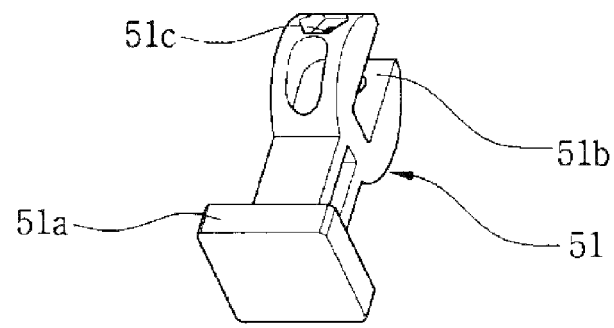
Figure 3C:
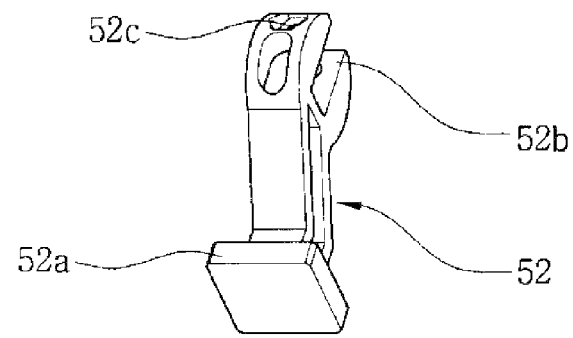

As shown in FIGS. 3B and 3C, each of the second and third joint members 51 and 52 has a spanner type receivable slot 51b, 52b formed at one end of a shaft thereof, and a rectangular insertional piece 51a, 52a formed at the other end of the shaft. The spanner type receivable slot 51b, 52b can receive the laterally protruding connector 45a of one robot component 40, and the rectangular insertional piece 51a, 52a can be inserted into the receivable connector 42b of another robot component 40. The second and third joint members 51 and 52 each has a screw hole 51c, 52c which communicates with the laterally protruding connector 45a through the receivable slot 51b, 52b. The shaft of the second joint member 51 is a straight-line type, and the shaft of the third joint member 52 is a curved type.

Figure 3D:
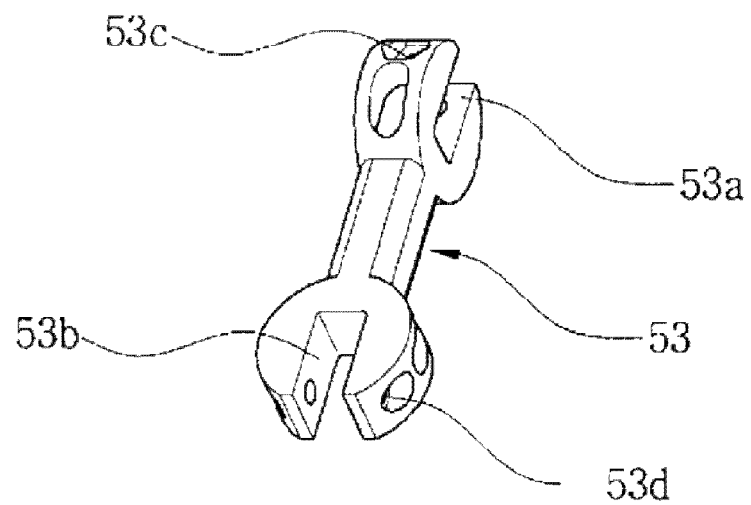

As shown in FIG. 3D, the fourth joint member 53 has two spanner type receivable slots 53a and 53b formed at both ends of a shaft thereof. The spanner type receivable slots 53a and 53b can receive the laterally protruding connectors 45a of different robot components 40, respectively. Both receivable slots 53a and 53b are arranged at right angles to each other. The fourth joint member 53 also has screw holes 53c and 53d.

Figure 3E:
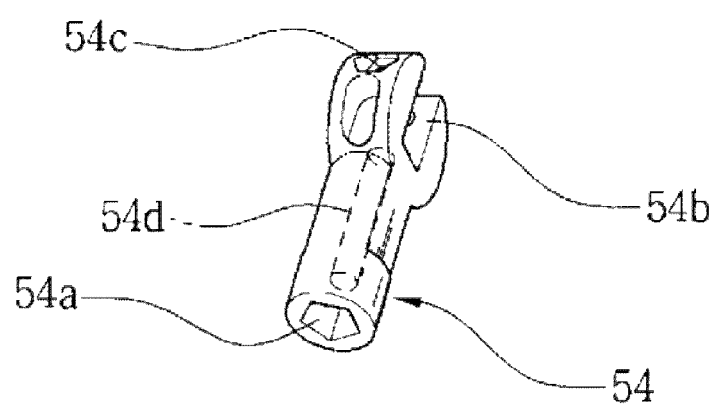

As shown in FIG. 3E, the fifth joint member 54 has a pentagonal receivable hole 54a formed at one end of a shaft thereof, and a spanner type receivable slot 54b formed at the other end. The pentagonal receivable hole 54a can receive the rotatable connector 45b of one robot component 40, and the spanner type receivable slot 54b can receive the laterally protruding connector 45a of another robot component 40. The fifth joint member 54 also has screw holes 54c and 54d.

Figure 3F:
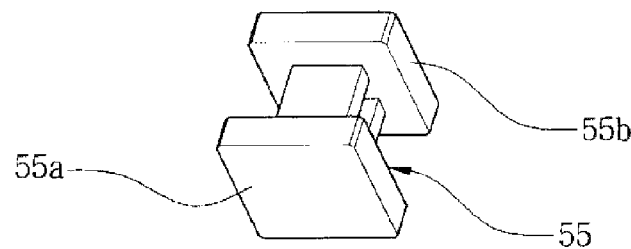
Figure 3G:
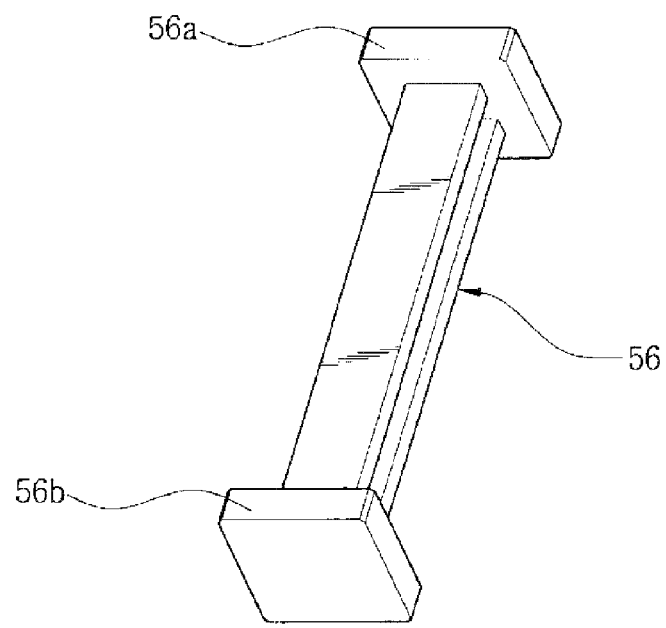

As shown in FIGS. 3F and 3G, each of the sixth and seventh joint members 55 and 56 has two rectangular insertional pieces 55a, 55b, 56a, 56b formed at both ends of a shaft thereof. The rectangular insertional pieces 55a, 55b, 56a, 56b can be inserted into the receivable connectors 42b of different robot components 40. The shaft of the sixth joint member 55 is relatively short, and the shaft of the seventh joint member 56 is relatively long.

Figure 3H:
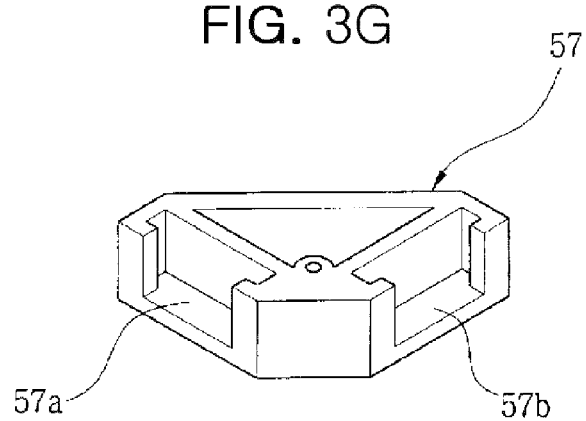

As shown in FIG. 3H, the eighth joint member 57 is in the shape of an approximately triangular plate. The eighth joint member 57 has two rectangular receivable grooves 57a and 57b, which are arranged at right angles to each other. The receivable grooves 57a and 57b can receive the rectangular insertional pieces of the above-mentioned joint members.

Figure 3I:
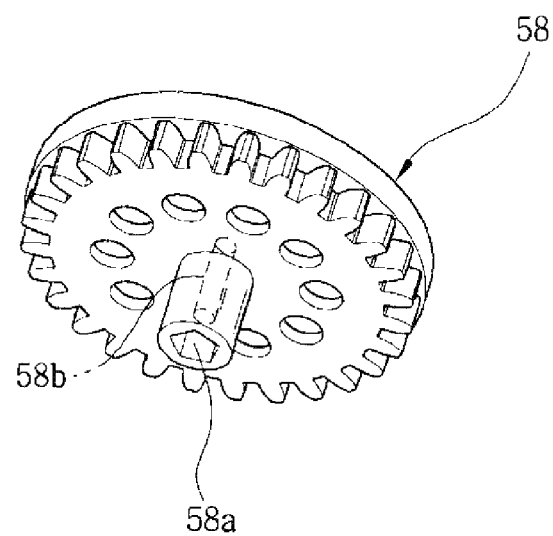
Figure 3J:
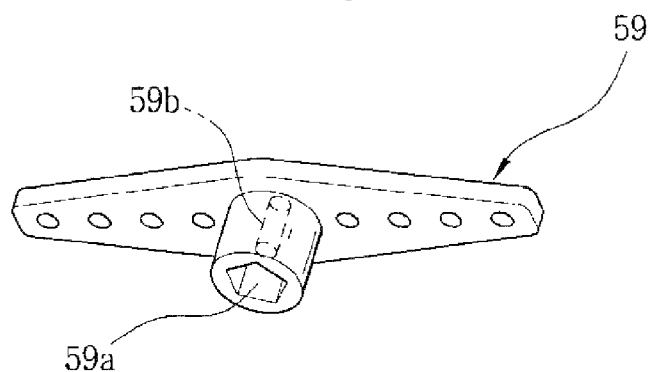

As shown in FIGS. 3I and 3J, the ninth and tenth joint members 58 and 59 are formed like a wheel and a wing, respectively. The ninth and tenth joint members 58 and 59 each has a pentagonal receivable hole 58a, 59a, which can receive the rotatable connector 45b of the robot component 40. Each of the ninth and tenth joint members 58 and 59 has also a screw hole 58b, 59b.

Figure 3K:
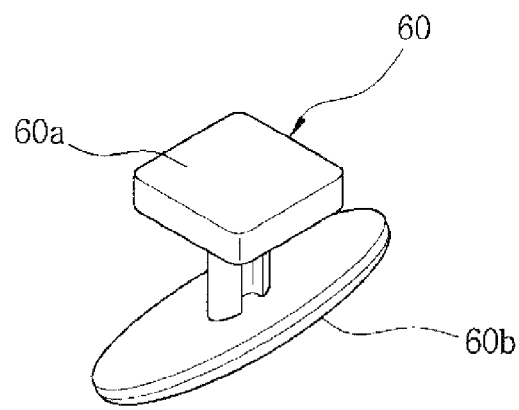

Lastly, as shown in FIG. 3K, the eleventh joint member 60 is formed like a foot. The eleventh joint member 60 has a rectangular insertional piece 60a at one end of a shaft thereof, and a hemispherical rolling part at the other end. The insertional piece 60a can be inserted into the receivable connector 42b of the robot component 40, and the rolling part 60b is wider in area than the insertional piece 60a.

FIGS. 4A to 14B are perspective views illustrating various coupling states of the joinable robot components by using the first to eleventh joint members shown in FIGS. 3A to 3K.

Figure 4A:
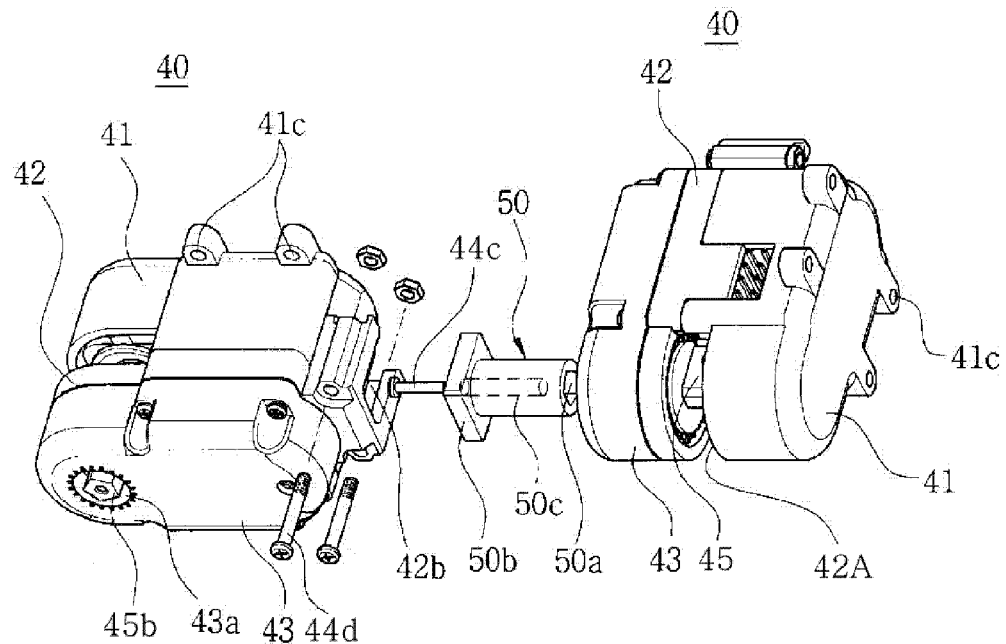
FIGS. 4A to 14B are perspective views illustrating various coupling states of the joinable robot components by using the first to eleventh joint members shown in FIGS. 3A to 3K.
Figure 4B:
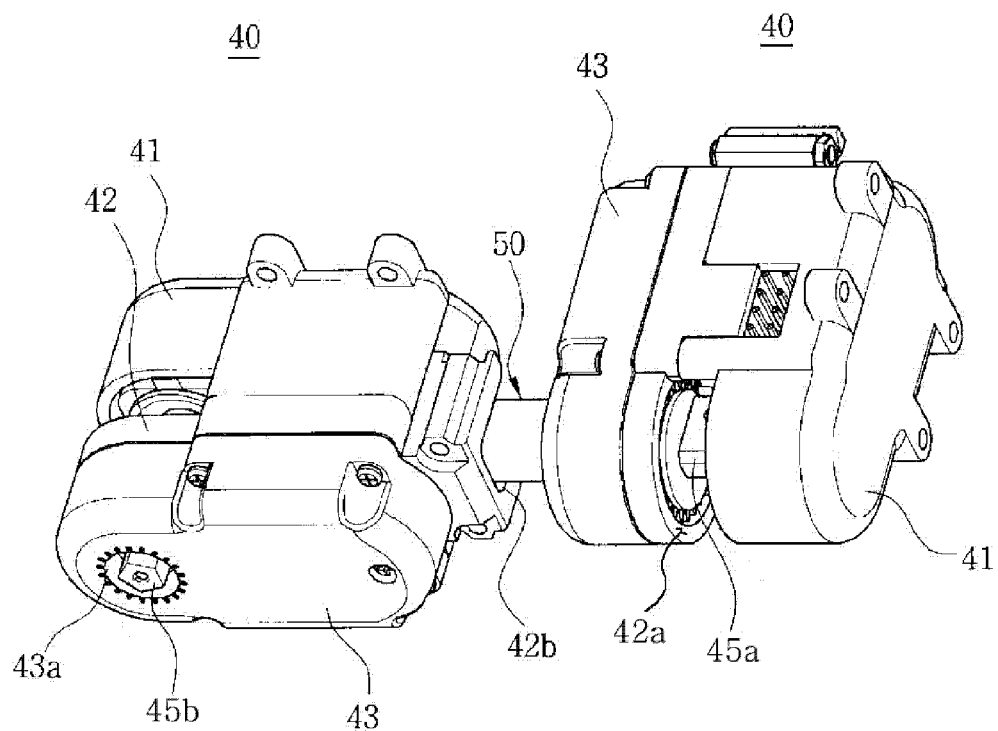

FIGS. 4A and 4B show a coupling of two robot components 40 using the first joint member 50 shown in FIG. 3A. Referring to FIGS. 4A and 4B, the rotatable connector 45b of a right robot component 40 is inserted into the pentagonal receivable hole 50a of the first joint member 50, and then a screw 44c is inserted into the screw hole 50c. The screw 44c advances into the screw hole in the rotatable connector 45b, so the first joint member 50 is fixed to the rotatable connector 45b of the right robot component 40. Additionally, the rectangular insertional piece 50b of the first joint member 50 is inserted into the receivable connector 42b of a left robot component 40, and then fixed by screws 44d.

Figure 5A:
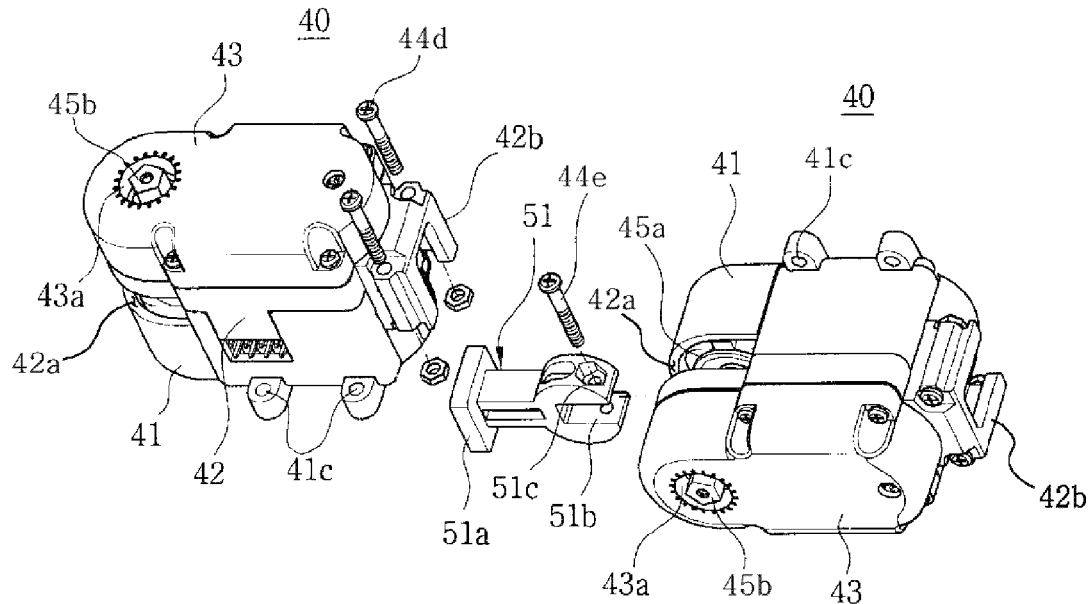
Figure 5B:
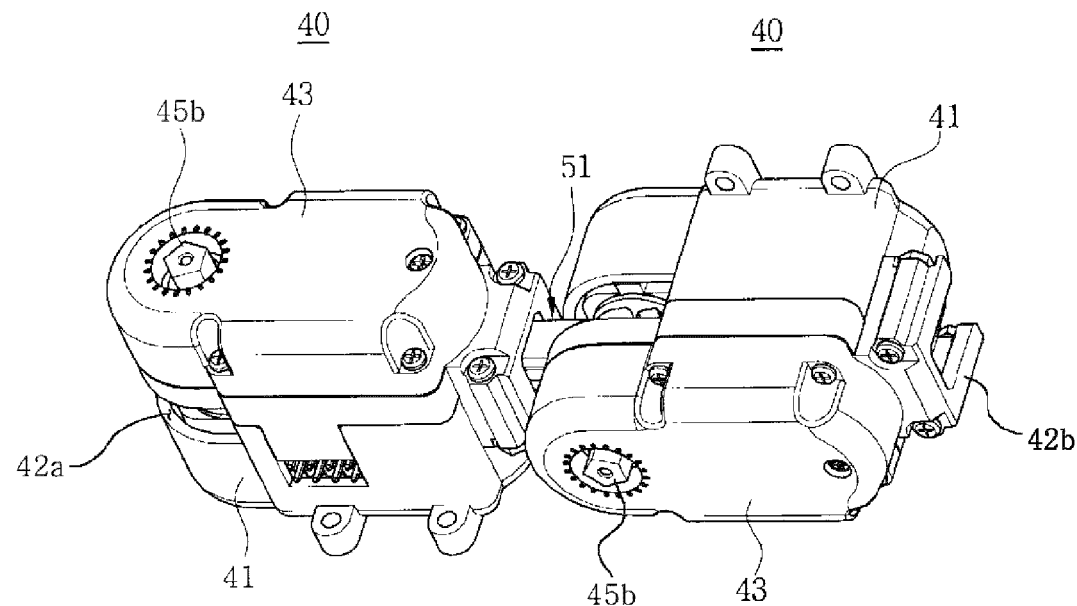

FIGS. 5A and 5B show a coupling of two robot components 40 using the second joint member 51 shown in FIG. 3B. Referring to FIGS. 5A and 5B, the laterally protruding connector 45a of a right robot component 40 is inserted into the spanner type receivable slot 51b of the second joint member 51, and then a screw 44e is inserted into the screw hole 51c. The screw 44e advances into the laterally protruding connector 45a, so the second joint member 51 is fixed to the laterally protruding connector 45a of the right robot component 40. Additionally, the rectangular insertional piece 51a of the second joint member 51 is inserted into the receivable connector 42b of a left robot component 40, and then fixed by screws 44d.

Figure 6A:
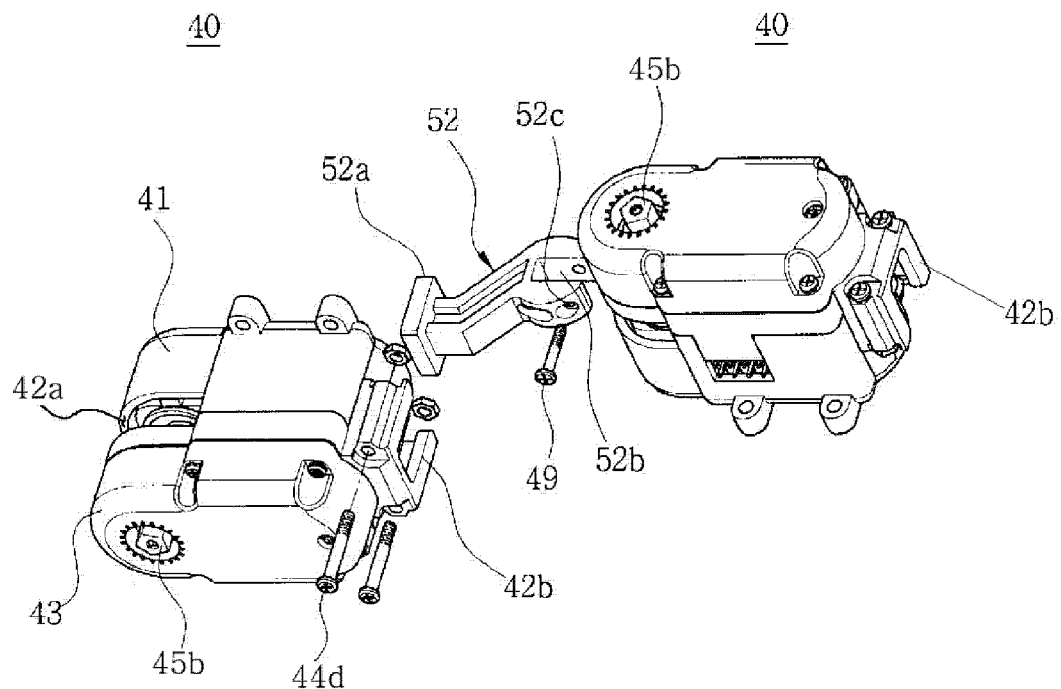
Figure 6B:
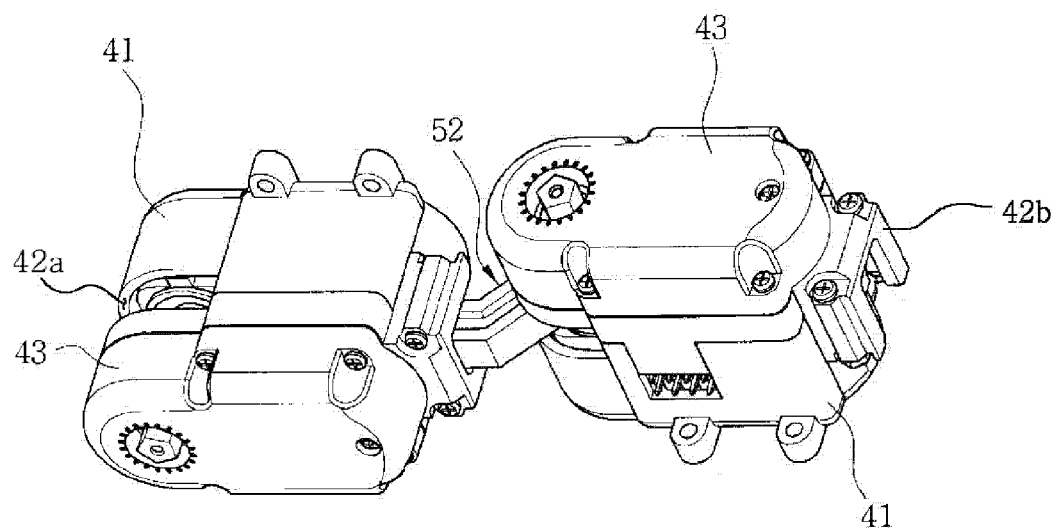

FIGS. 6A and 6B show a coupling of two robot components 40 using the third joint member 52 shown in FIG. 3C. Since this coupling is similar to that shown in FIGS. 5A and 5B, a detailed description is omitted.

Figure 7:
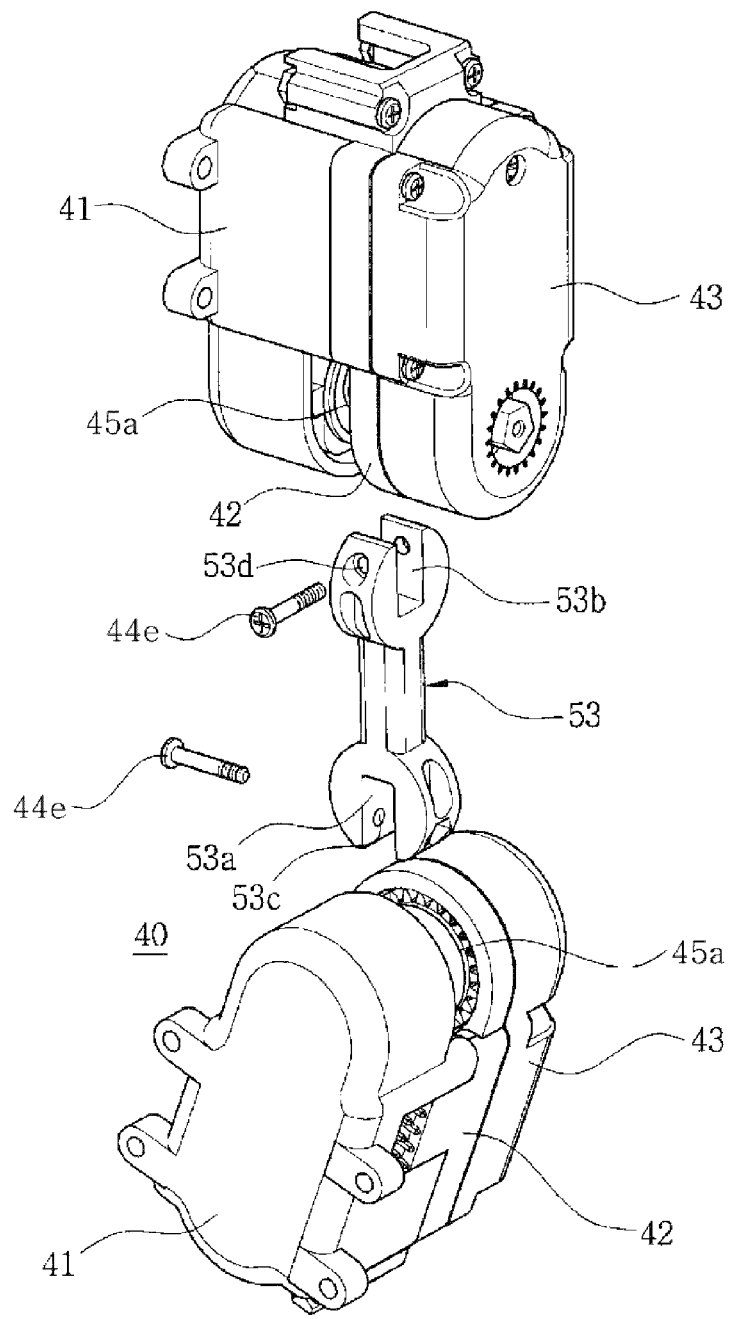

FIG. 7 shows a coupling of two robot components 40 using the fourth joint member 53 shown in FIG. 3D. Referring to FIG. 7, both the laterally protruding connectors 45a of upper and lower robot components 40 are respectively inserted into the spanner type receivable slots 51b of the fourth joint member 53, and then screws 44e are inserted into the screw holes 53c and 53d. The screws 44e advance into the laterally protruding connectors 45a, so the fourth joint member 53 is fixed to the laterally protruding connectors 45a of the upper and lower robot components 40.

Figure 8A:
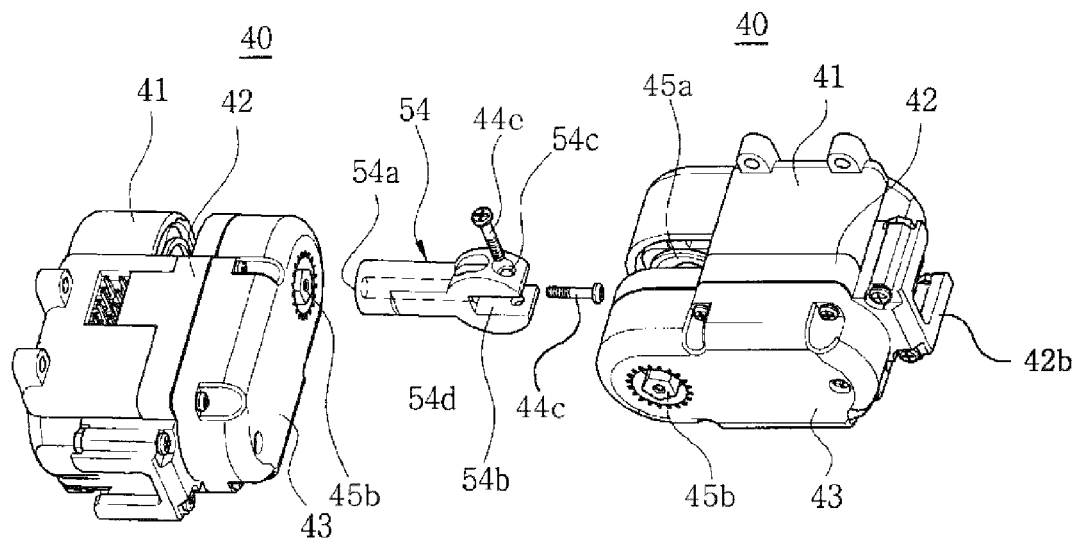
Figure 8B:
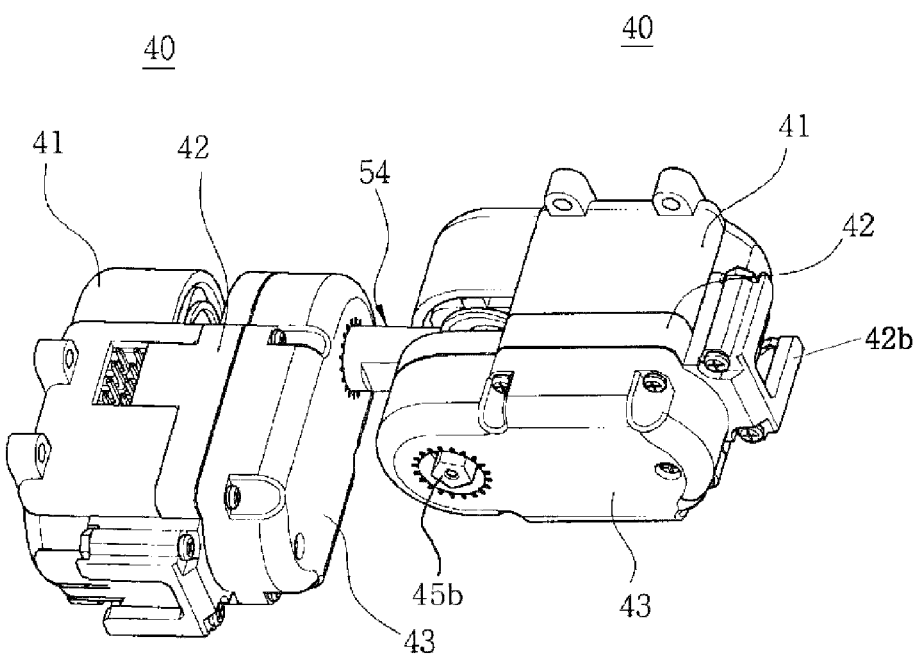

FIGS. 8A and 8B show a coupling of two robot components 40 using the fifth joint member 54 shown in FIG. 3E. Referring to FIGS. 8A and 8B, the rotatable connector 45b of a left robot component 40 is inserted into the pentagonal receivable hole 54a of the fifth joint member 54, and then a screw 44c is inserted into the screw hole 54d. The screw 44c advances into the screw hole in the rotatable connector 45b, so the fifth joint member 54 is fixed to the rotatable connector 45b of the left robot component 40. Additionally, the laterally protruding connector 45a of a right robot component 40 is inserted into the spanner type receivable slot 54b of the fifth joint member 54, and then a screw 44e is inserted into the screw hole 54c. The screw 44e advances into the laterally protruding connector 45a, so the fifth joint member 54 is fixed to the laterally protruding connector 45a of the right robot component 40.

Figure 9A:
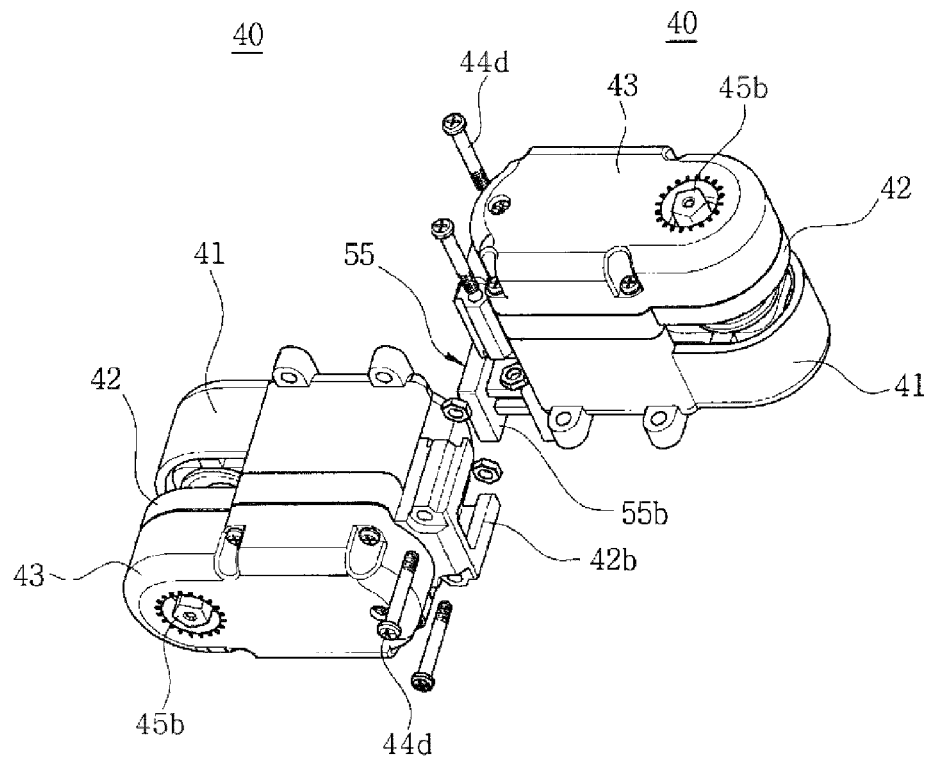
Figure 9B:
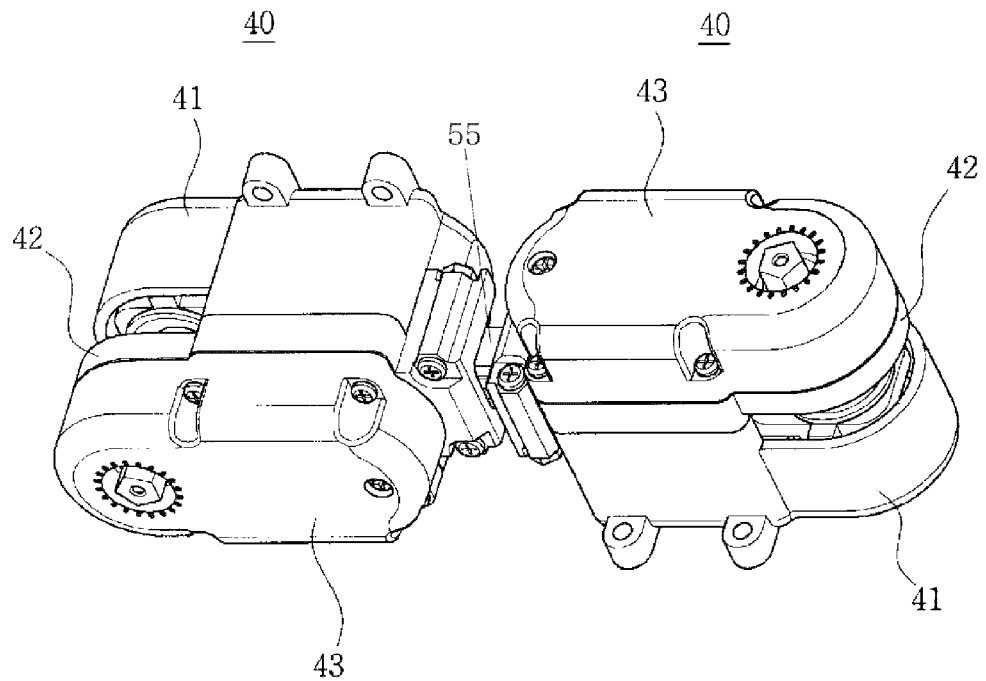

FIGS. 9A and 9B show a coupling of two robot components 40 using the sixth joint member 55 shown in FIG. 3F. Referring to FIGS. 9A and 9B, both the rectangular insertional pieces 55a and 55b of the sixth joint member 55 are respectively inserted into the receivable connectors 42b of left and right robot components 40. Then screws 44d are inserted into screw holes in the receivable connectors 42b, so the sixth joint member 55 is fixed to the receivable connectors 42b of the left and right robot components 40.

Figure 10A:
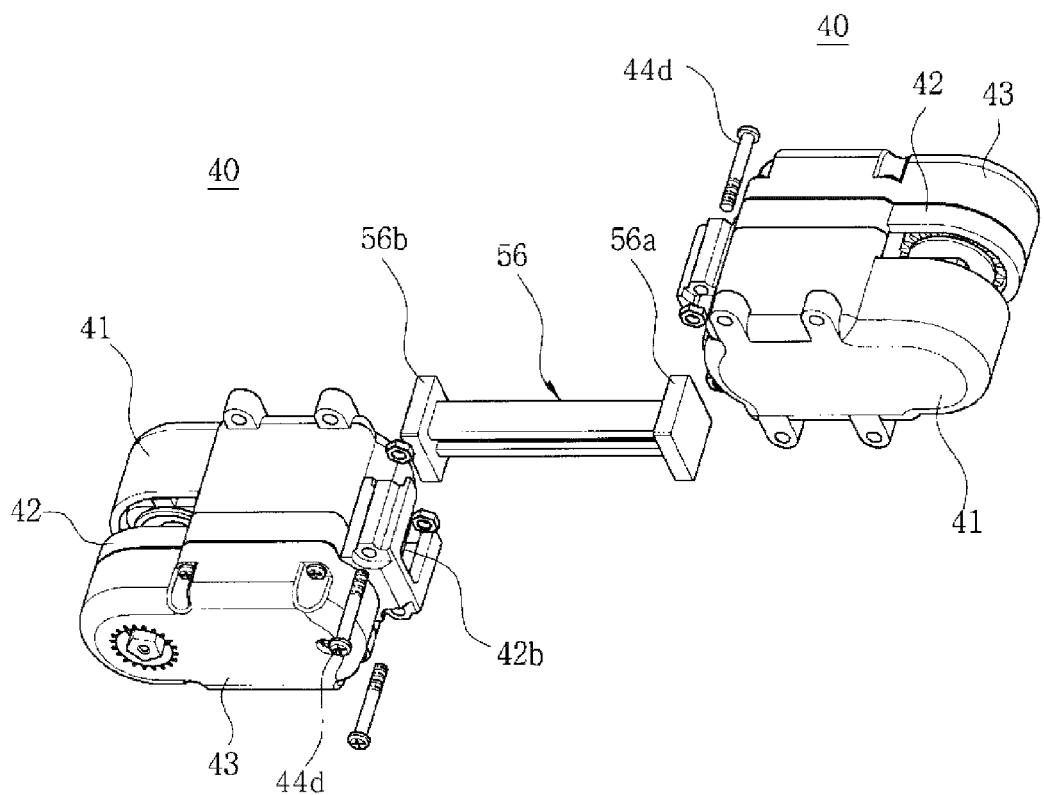
Figure 10B:
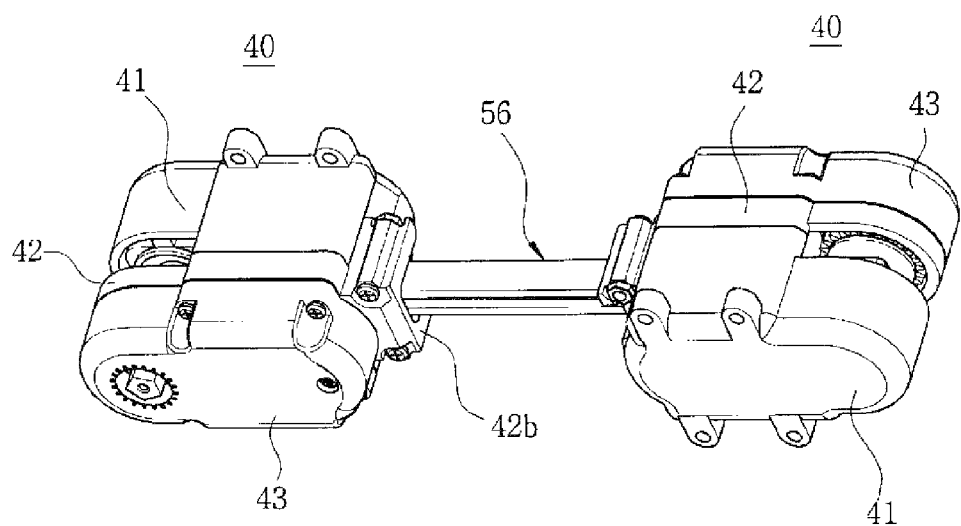

FIGS. 10A and 10B show a coupling of two robot components 40 using the seventh joint member 56 shown in FIG. 3G Since this coupling is similar to that shown in FIGS. 9A and 9B, a detailed description is omitted.

Figure 11A:
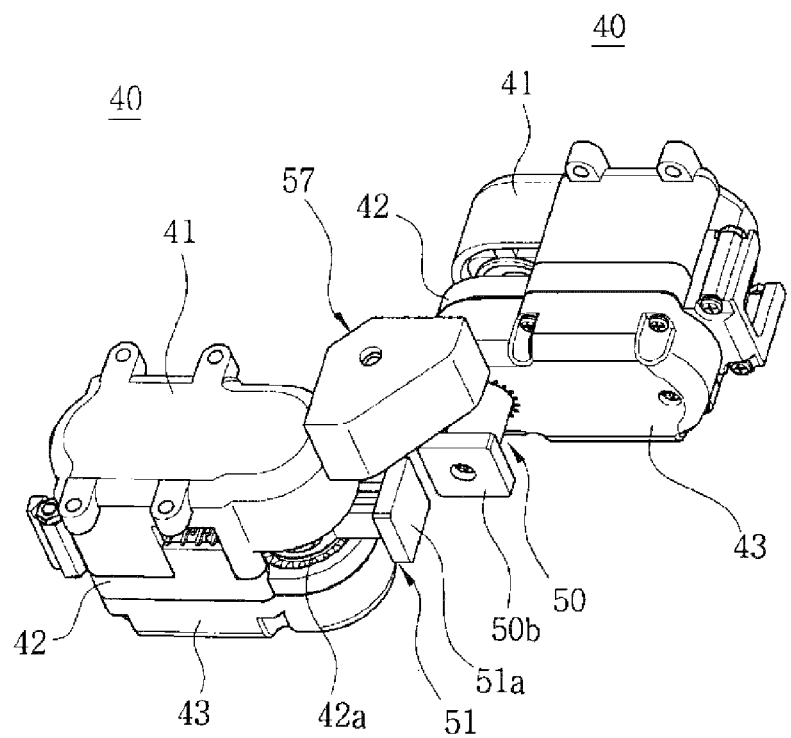
Figure 11B:
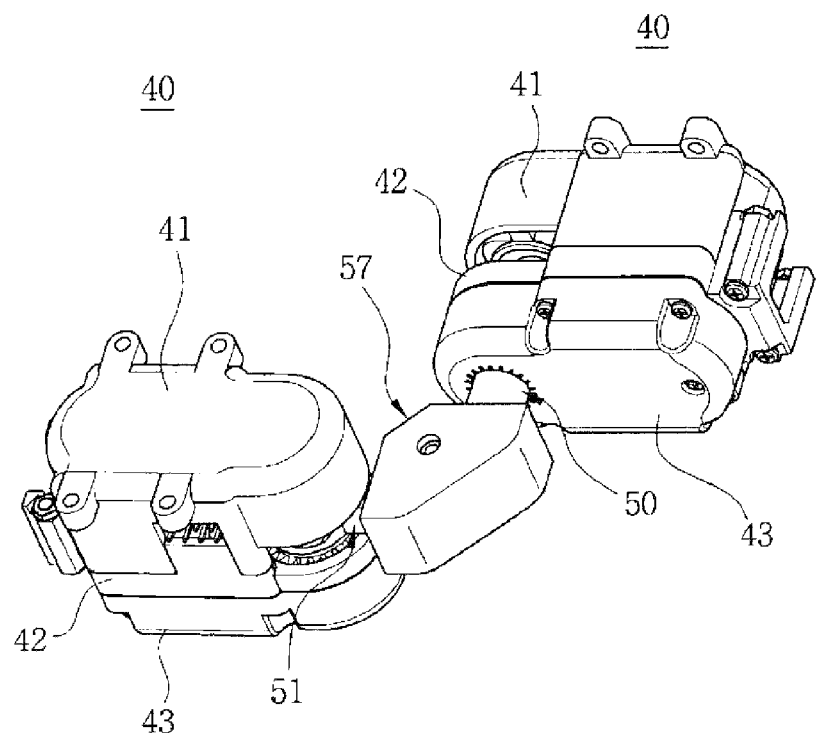

FIGS. 11A and 11B show a coupling of two robot components 40 using the eighth joint member 57 shown in FIG. 3H. In particular, the eighth joint member 57 needs other joint members having the rectangular insertional piece. FIGS. 11A and 11B use the first and second joint members 50 and 51, for example. Referring to FIGS. 11A and 11B, the first and second joint members 50 and 51 are respectively coupled to right and left robot components 40, and their rectangular insertional pieces 50b and 51a are respectively inserted into the receivable grooves 57a and 57b of the eighth joint member 57.

Figure 12A:
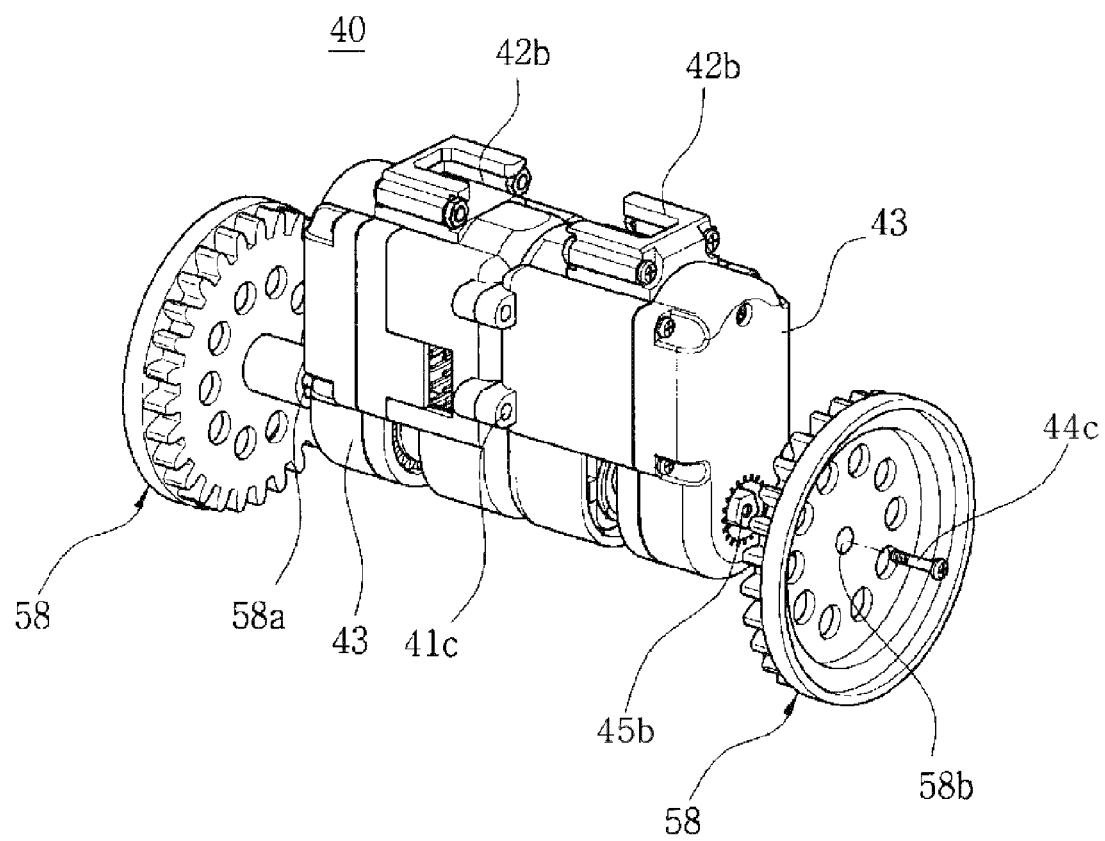
Figure 12B:
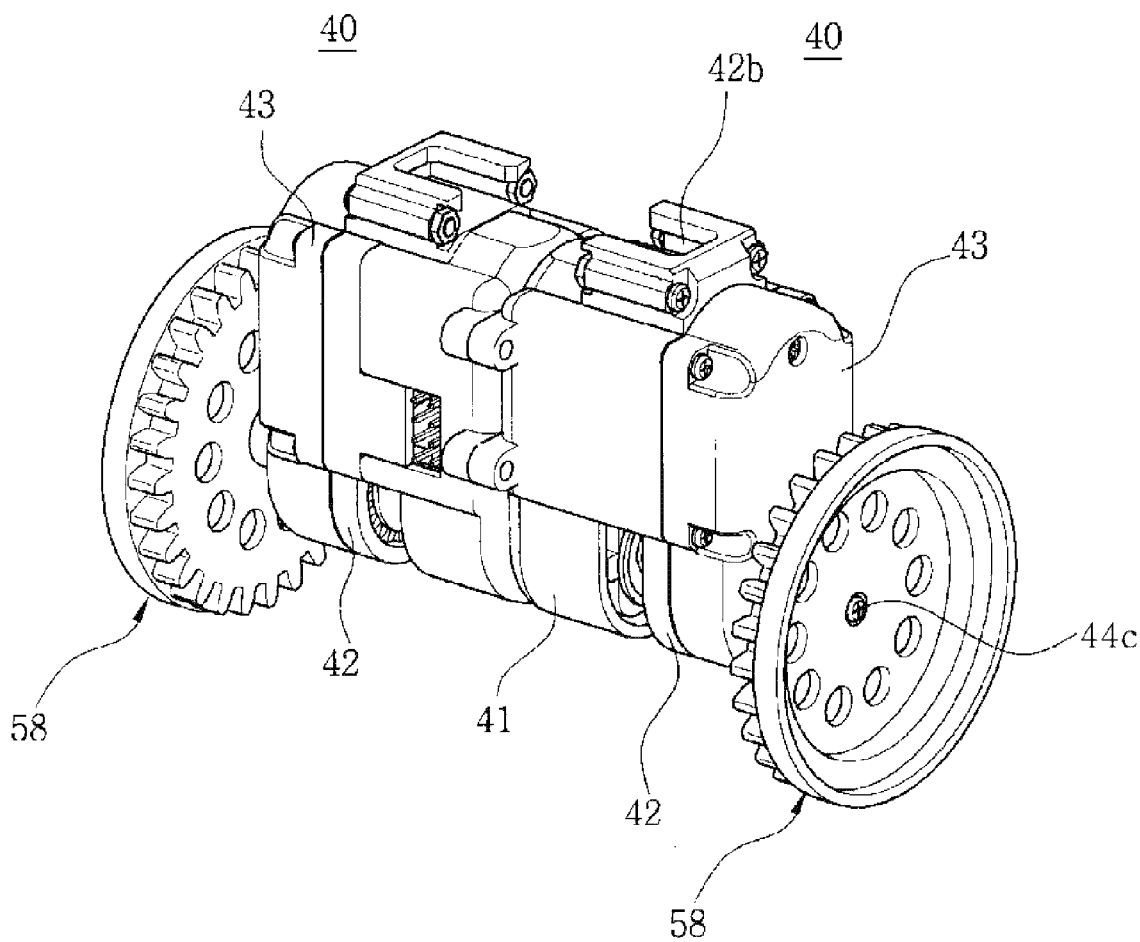

FIGS. 12A and 12B show a coupling of two robot components 40 using the ninth joint member 58 shown in FIG. 3I. Referring to FIGS. 12A and 12B, the rotatable connector 45b of the robot component 40 is inserted into the pentagonal receivable hole 58a of the ninth joint member 58, and then a screw 44c is inserted into the screw hole 58b.

Figure 13A:
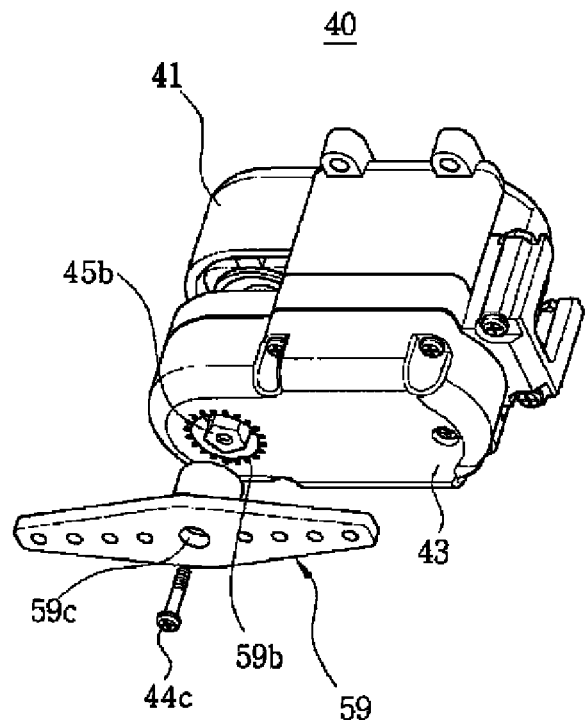
Figure 13B:
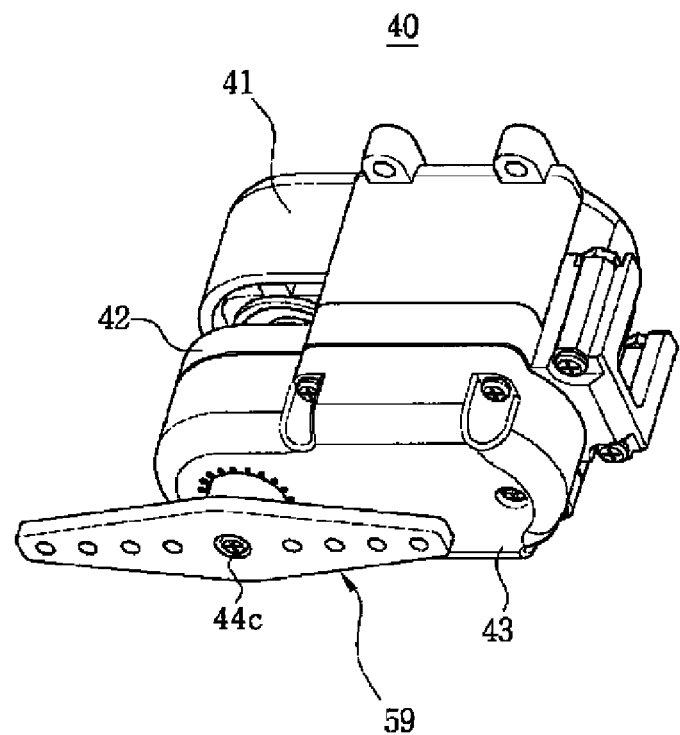

FIGS. 13A and 13B show a coupling of two robot components 40 using the tenth joint member 59 shown in FIG. 3J. Since this coupling is similar to that shown in FIGS. 12A and 12B, a detailed description is omitted.

Figure 14A:
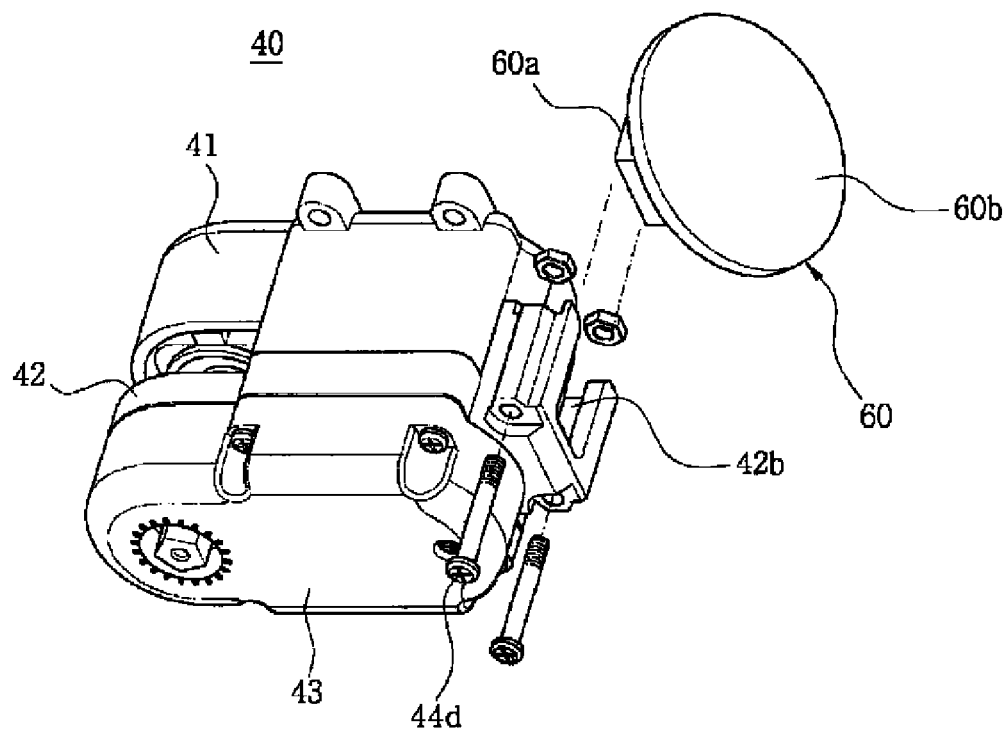
Figure 14B:
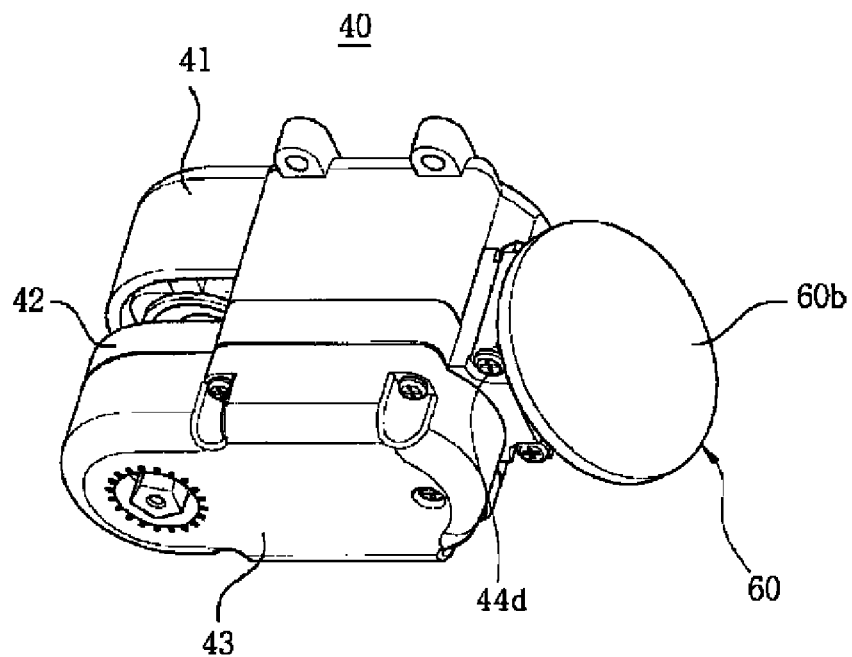

FIGS. 14A and 14B show a coupling of two robot components 40 using the eleventh joint member 60 shown in FIG. 3K. The rectangular insertional piece 60a of the eleventh joint member 60 is inserted into the receivable connector 42b of the robot component 40, and then fixed by screws 44d.

Figure 15:
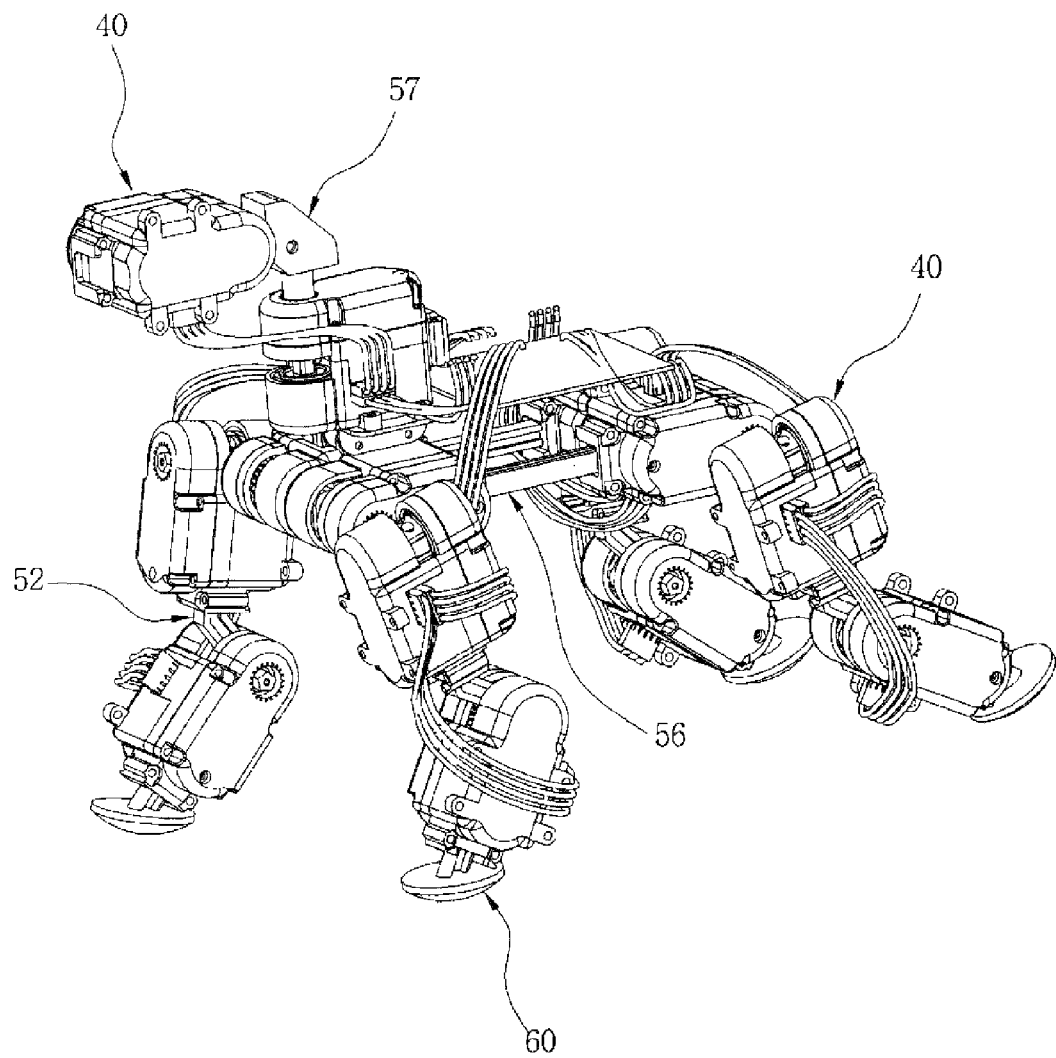
FIG. 15 is a perspective view of a robot toy according to an embodiment of the present invention.
Figure 16:
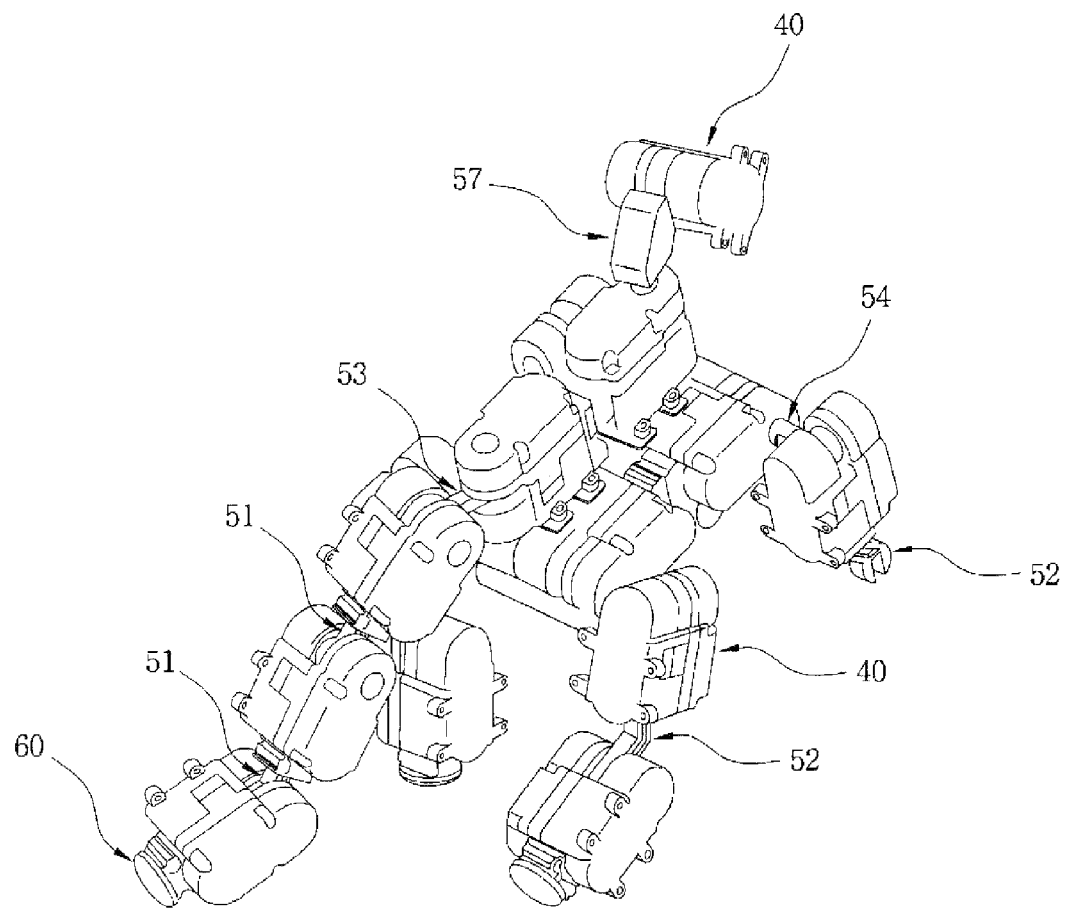
FIG. 16 is a perspective view of a robot toy according to another embodiment of the present invention.

As discussed above, the robot components 40 are mechanically joined to each other by means of several kinds of joint members 50 to 60 and thus realize the complete robot toy. FIGS. 15 and 16 are perspective views showing a robot toy according to embodiments of the present invention.

Figure 17:
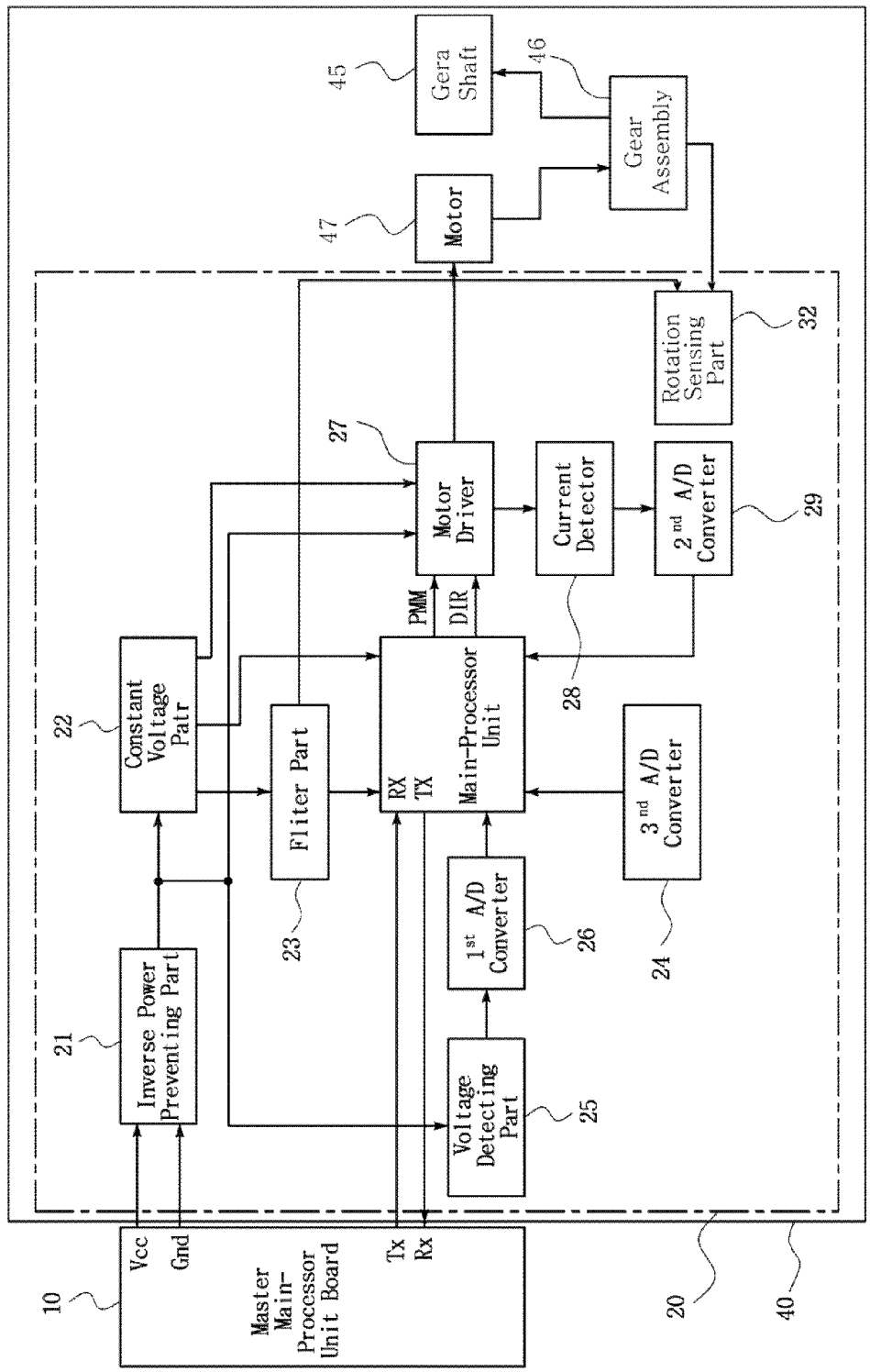
FIG. 17 is a block diagram of a robot component for a robot toy according to an embodiment of the present invention.

Furthermore, the robot components 40 are electrically coupled in series or parallel to each other through two power lines, a single transmission line and a reception line. FIG. 17 is a block diagram of a robot component for a robot toy according to an embodiment of the present invention.

Referring to FIG. 17, the robot component 40 has the motor 47 that generates the turning force driving the gear shaft 45. The motor 47 is electrically coupled to the circuit board 20 that supplies an electric power and control signals to the motor 47. That is, the circuit board 20 acts as a joint control system. In the complete robot toy composed of several robot components 40, one robot component has a master main-processor unit board 10 instead of the circuit board 20, and the other robot components respectively have the joint control system 20. Each joint control system 20 transmits and receives data to and from the master main-processor unit board 10, as will be described later.

The master main-processor unit board 10 outputs robot control signals that correspond to predefined operation patterns in the other robot components. Each joint control system 20 operates the corresponding robot component 40 according to the predefined operation pattern while transmitting and receiving data to and from the master main-processor unit board 10.

The joint control system 20 includes an inverse power preventing part 21 supplied with a non-driving voltage of the master main-processor unit board 10 to prevent an inverse voltage input to the master main-processor unit board 10, and a constant voltage part 22 for converting and outputting the output non-driving voltage of the inverse power preventing part 21 to a constant level of digital voltage. The joint control system further includes a filter part 23 for filtering a noise including a ripple voltage from the supply voltage of the constant voltage part 22 and supplying a filtered voltage, and a voltage detecting part 25 for detecting level of the non-driving voltage inputted from the inverse power preventing part 21 and outputting a resultant voltage.

Furthermore, the joint control system 20 includes a motor driving part 27 for controlling and driving the motor 47 in a pulse width modulation (PWM) way according to the voltages obtained by the constant voltage part 22 and the inverse power preventing part 21, and a rotation sensing part 32 driven by the supply voltage of the filter part 23 to sense the rotation of the gear assembly 46, a current detecting part 28 for detecting a load current of the motor 47 through the motor driving part 27. The joint control system 20 also includes first to third A/D converters 26, 28 and 33 for converting and outputting the output signals of the voltage detecting part 25, the current detecting part 28, and the rotation sensing part 32 to digital signals respectively.

The joint control system 20 further includes a main-processor unit 24 that outputs a pulse width modulation (PWM) signal and a direction (DIR) signal depending on operation modes provided from the master main-processor unit board 10 to control the operation of the motor 47 through the motor driving part 27. Additionally, the main-processor unit 24 respectively computes the voltage level, the current level, and the rotational ratio obtained by the first to third A/D converters 26, 28 and 33, and then transmits the computed data to the master main-processor unit board 10.

In the complete robot toy, the master main-processor unit board 10 receives present positions of the respective robot components 40 from their main-process units 24. For example, the master main-processor unit board 10 reads, through the reception port (Rx), a joint angle if the robot component 40 is a hand, a moved distance if the joint member 40 is a foot, and a moved angle if the robot component 40 is a tail or a head.

Then, the master main-processor unit board 10 sets the action mode (operation mode) of each robot component 40 to a motor down mode. Thereafter, the master main-processor unit board 10 transmits a command to each robot component 40 through the transmission port (Tx), and then receives a present position and a present current through the reception port (Rx).

After the present position of each robot component 40 is ascertained, preset target position and velocity are computed on the basis of the received present position. Then the computed new target position and sampling time (velocity value, i.e., motion angle of joint) are transmitted through the transmission port (Tx) in accordance with communication protocol. After that, the action mode (operation mode) of the robot components 40 is set to a position sense mode, and then a command is transmitted to the respective robot components 40. In other words, directly after the target position and velocity value are transmitted, the present position and the present current are received to ascertain whether or not there exists a variation between the previous position and the present position, and also to ascertain the state of the present current. Afterwards, a new action is planned using the ascertained position variation and the current state information. If the plan is completed, steps of computing next target position and velocity of each of the joint members suitable for new actions, i.e., steps of computing the motion angle of the joints, are repeatedly performed.

Figure 18A:
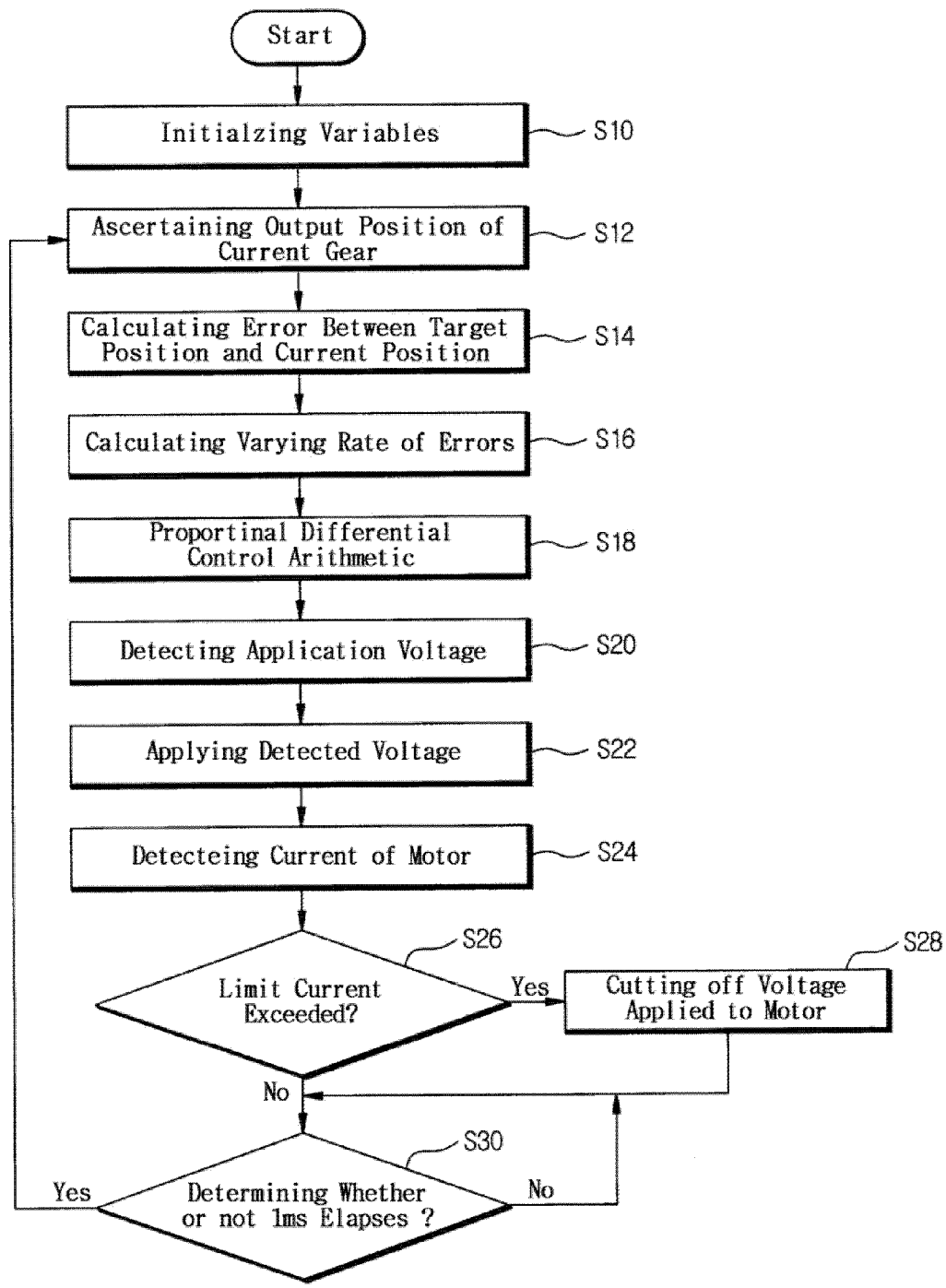
FIGS. 18A and 18B are flowcharts illustrating a method of controlling a robot toy according to an embodiment of the present invention.
Figure 18B:
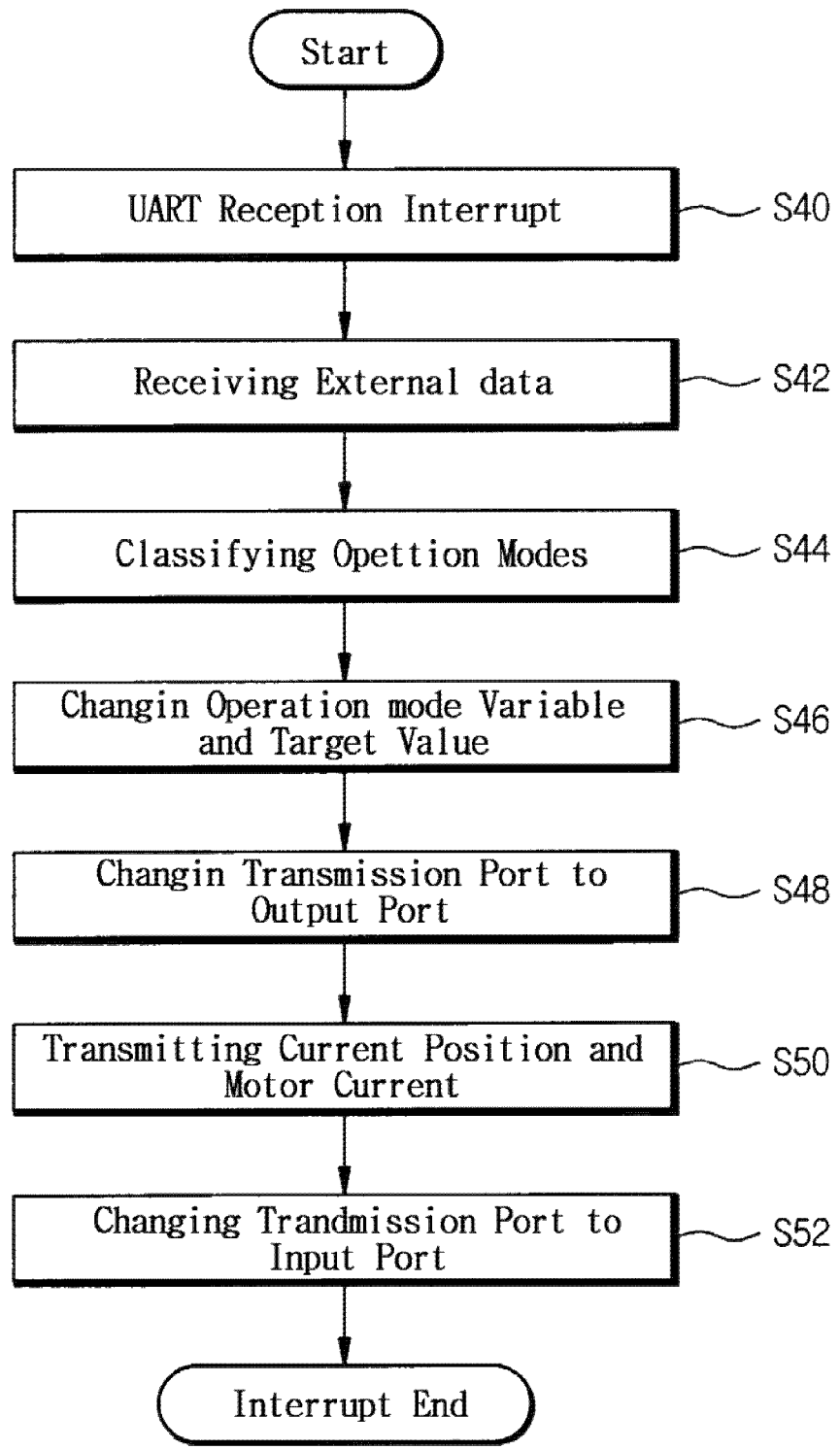

FIGS. 18A and 18B are flowcharts illustrating a method of controlling a robot toy according to an embodiment of the present invention.

Referring to FIGS. 18A, 18B and 17, the main-processor unit 24 of the joint control part 20 in each robot component 40 initializes the variables once an operation starts through a switch (S10).

After the initialization is released, the main-processor unit 24 ascertains an output position of the present gear through the third A/D converter 33 and the rotation sensing part 32 (S12). And the main-processor unit 24 calculates an error between the new target position provided by the master main-processor unit board 10 and the ascertained present position (S14). Then, variation rate in the calculated errors is computed (S16) and proportional differential control arithmetic is performed (S18).

After that, a non-driving voltage provided from the master main-processor unit board 10 is detected through the inverse voltage preventing part 21, the voltage detecting part 25, and the first A/D converter 26 (S20). And a real voltage applied to the motor 47 is calculated from the proportional differential arithmetic value and the level of the detected non-driving voltage. The calculated voltage is modulated to a PWM signal, and the PWM signal is applied to the motor 47 through the motor driving part 27 together with the direction (DIR) signal to drive the motor 30 (S22).

When the motor 47 is driven, the gear assembly 46 and the gear shaft 45 of the corresponding robot component 40 rotate. Therefore, another robot component coupled to the gear shaft 45 through the joint member traces the target position provided from the master main-processor unit board 10. For example, in a robot hand component a joint angle traces the target position, in a robot foot component a moved distance traces the target position, and in a robot tail or head component a moved angle traces the target position.

Thus, in a state that the respective robot components 40 are moved by the motor 47 and the gear assembly 46, the main-processor unit 24 detects the current of the motor 47 through the current detecting part 28 and the second A/D converter 29 (S24) and determines whether or not the detected current exceeds a set limitation current (S26). If it is determined that the detected current exceeds the set limitation current, the main-processor unit 24 cuts off the voltage applied to the motor 30 (S28). If it is determined that the detected current does not exceed the set limitation current, the main-processor unit 24 determines whether or not the limitation current exceeds 1 ms, i.e., repetition routine time elapses (S30). If it is determined that the limitation time does not exceeds the repetition routine time, the main-processor unit 24 maintains the standby state, while if it is determined that the limitation time exceeds the repetition routine time, the main-processor unit 24 repeatedly performs the steps after the step S10.

Thus, while performing motions with tracing the target position provided from the master main-processor unit board 10, if interrupt is generated (S40), the main-processor units 24 of the joint control parts 20 received in the respective robot components 40 receive data through the reception port (Rx) (S42), and classify operation modes to be described later (S44).

Also, the main-processor units 24 change the operation mode variables and the target position (S46), and change the transmission port (Tx) thereof to an output port (S48). Herein, the main-processor unit 24 receives data from the master main-processor unit board 10 by using the transmission port (Tx) as an input port in a normal state, and if each operation thereof is ended, the main-processor unit 24 changes the transmission port (Tx) to the output port so as to transmit the result of the respective operations in the format of data.

Next, after changing the transmission port (Tx) to the output port, the main-processor unit 24 detects the present position of the motor 47, i.e., the present position of the corresponding robot component 40 and the current of the motor 47, and transmits the detected results to the master main-processor unit board 10 through the changed output port (S50). After transmitting the detected present position and current, the main-processor unit 24 changes the transmission port (Tx) to the input port (S52), and completes the interrupt operation.

The aforementioned operation modes are classified into position send mode, motor down mode, power down mode and wheel act mode.

The position send mode indicates an operation mode in which the motor 47 is operated for the position control, a position control range is from zero to 332.3 degree, and the present position and current thereof are transmitted after the position control command is received.

The motor down mode indicates a mode in which the motor power is changed to zero, a user can arbitrarily change the motor position by his (or her) power, and the present position and current return to after a command is received. The motor down mode operates as a sensor used for changing the position by an external force.

The power down mode is used for minimizing the operation power consumption of the motor system and the system power. The power down mode returns the IDs and positions of the corresponding joint members 40 after receiving a command, and is used to want to know the motor IDs of the corresponding robot components 40.

Lastly, the wheel act mode operates the motor to drive the wheel, makes it possible to rotate the wheel clockwise or counterclockwise by an angle of 360 degree and control the velocity of the wheel. In the wheel act mode, rotation amount and present position are transmitted after a command is received.

The aforementioned operation modes receive commands from the master main-processor unit board 10.

From the above descriptions, unlike the conventional art which does not allow a user to expandably assemble one set of robot toy as various shapes of robot toys, for instance, puppy robot, dinosaur robot, or android, it can be well known that it is possible to expandably assemble various shapes of robot toys needing motions by using a plurality of robot components corresponding to one kind.

As described above, robot toys according to the present invention provide users with love and interest. Also, it is possible to address all functions of such robot toys to a maximum degree at a low manufacturing cost and to assemble and control the robot toys requesting motions in various shapes with ease by using one kind of robot component. Furthermore, the inventive robot toys provide users with easy disorder coping and expandable assembling capability.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A joinable robot component comprising:
   a circuit board;
   a lower case accommodating the circuit board;
   a middle housing located above the lower case and the circuit board and having a slot-like opening formed at a first end thereof, a receivable connector formed at a second end thereof, and a first hole formed above the opening;
   a gear shaft inserted into and upwardly extended from the first hole, vertically passing through the opening, and having a laterally protruding connector located in the opening and an upper end acting as a rotatable connector;
   a motor located between the circuit board and the middle housing and electrically coupled to the circuit board;
   a gear assembly located over the middle housing and transmitting a turning force generated by the motor to the gear shaft;
   an upper case located above the middle housing, covering the gear shaft and the gear assembly, and having a second hole formed above the first hole, the second hole receiving the upper end of the gear shaft; and
   at least one joint member having at least one of a pentagonal receivable hole, a rectangular insertional piece, and a spanner type receivable slot,
   wherein each joint member is engaged with one of the rotatable connector, the laterally protruding connector, and the receivable connector.

2. The joinable robot component of claim 1, wherein the circuit board is a joint control system which supplies an electric power and control signals to the motor and which transmits and receives data to and from a master main-processor unit board of another joinable robot component.

3. The joinable robot component of claim 2, wherein the joint control system includes:
   an inverse power preventing part supplied with a non-driving voltage to prevent an inverse voltage;
   a constant voltage part for converting and outputting the output non-driving voltage of the inverse power preventing part to a constant level of digital voltage;
   a filter part for filtering a noise including a ripple voltage from the supply voltage of the constant voltage part and supplying a filtered voltage;
   a voltage detecting part for detecting level of the non-driving voltage obtained from the inverse power preventing part;
   a motor driving part for controlling and driving the motor in a pulse width modulation (PWM) way according to the voltage obtained by the constant voltage part and the inverse power preventing part;

a rotation sensing part driven by the supply voltage of the filter part to sense the rotation of the gear assembly;

a current detecting part for detecting a load current of the motor through the motor driving part;

first to third A/D converters for converting and outputting the output signals of the voltage detecting part, the current detecting part, and the rotation sensing part to digital signals respectively; and a main-processor unit for outputting a PWM signal and a direction signal depending on operation modes provided from the master main-processor unit board to drive the motor and respectively computing the voltage level, the current level and the rotational ratio obtained by the first to third A/D converters and transmitting the computed voltage level, the current level and the rotational ratio to the master main-processor unit board.

4. The joinable robot component of claim 1, further comprising:

a triangular plate shaped joint member having two rectangular receivable grooves which are arranged at right angles to each other, wherein each receivable groove receives the rectangular insertional piece when the joint member has the rectangular insertional piece.

5. The joinable robot component of claim 1, further comprising:

at least one of a wheel-like joint member, a wing-like joint member, and a foot-like joint member, which has a pentagonal receivable hole to be engaged with the rotatable connector.

6. A modifiable robot toy comprising:

a plurality of joinable robot components provided as assembly units for the robot toy;

a master main-processor unit board provided in a first one of the robot components and outputting robot control signals that correspond to predefined operation patterns in second ones of the robot components;

a plurality of joint control systems each provided in the second robot component and operating a corresponding one of the robot components according to the predefined operation pattern while transmitting and receiving data to and from the master main-processor unit board; and a plurality of joint members coupling the robot components so as to realize the complete robot toy, wherein each robot component includes:

a lower case accommodating a circuit board which is one of the master main-processor unit board and the joint control system;

a middle housing located above the lower case and the circuit board and having a slot-like opening formed at a first end thereof, a receivable connector formed at a second end thereof, and a first hole formed above the opening;

a gear shaft inserted into and upwardly extended from the first hole, vertically passing through the opening, and having a laterally protruding connector located in the opening and an upper end acting as a rotatable connector;

a motor located between the circuit board and the middle housing and electrically coupled to the circuit board;

a gear assembly located over the middle housing and transmitting a turning force generated by the motor to the gear shaft; and an upper case located above the middle housing, covering the gear shaft and the gear assembly, and having a second hole formed above the first hole, the second hole receiving the upper end of the gear shaft, and wherein the joint members include a shaft shaped joint member having two ends, each of which has one of a pentagonal receivable hole, a rectangular insertional piece, and a spanner type receivable slot, and wherein each end is engaged with one of the rotatable connector, the laterally protruding connector, and the receivable connector.

7. The modifiable robot toy of claim 6, wherein the robot components are electrically coupled in series or parallel to each other through two power lines, a single transmission line and a reception line.

8. The modifiable robot toy of claim 6, wherein the joint members include a triangular plate shaped joint member having two rectangular receivable grooves which are arranged at right angles to each other, and wherein each receivable groove receives the rectangular insertional piece when the joint member has the rectangular insertional piece.

9. The modifiable robot toy of claim 6, wherein the joint members include at least one of a wheel-like joint member, a wing-like joint member, and a foot-like joint member, which has a pentagonal receivable hole to be engaged with the rotatable connector.

10. The modifiable robot toy of claim 6, wherein each joint control system includes:

an inverse power preventing part supplied with a non-driving voltage to prevent an inverse voltage;

a constant voltage part for converting and outputting the output non-driving voltage of the inverse power preventing part to a constant level of digital voltage;

a filter part for filtering a noise including a ripple voltage from the supply voltage of the constant voltage part and supplying a filtered voltage;

a voltage detecting part for detecting level of the non-driving voltage obtained from the inverse power preventing part;

a motor driving part for controlling and driving the motor in a pulse width modulation (PWM) way according to the voltage obtained by the constant voltage part and the inverse power preventing part;

a rotation sensing part driven by the supply voltage of the filter part to sense the rotation of the gear assembly;

a current detecting part for detecting a load current of the motor through the motor driving part;

first to third A/D converters for converting and outputting the output signals of the voltage detecting part, the current detecting part, and the rotation sensing part to digital signals respectively; and a main-processor unit for outputting a PWM signal and a direction signal depending on operation modes provided from the master main-processor unit board to drive the motor and respectively computing the voltage level, the current level and the rotational ratio obtained by the first to third A/D converters and transmitting the computed voltage level, the current level and the rotational ratio to the master main-processor unit board.

* * * * *